US012594627B2

(12) United States Patent
Kayashima et al.

(10) Patent No.: US 12,594,627 B2
(45) Date of Patent: Apr. 7, 2026

(54) ADDITIVE MANUFACTURING SYSTEM

(71) Applicant: Mitsubishi Electric Corporation, Tokyo (JP)

(72) Inventors: Shun Kayashima, Tokyo (JP); Nobuyuki Sumi, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/572,210

(22) PCT Filed: Nov. 29, 2021

(86) PCT No.: PCT/JP2021/043641
§ 371 (c)(1),
(2) Date: Dec. 20, 2023

(87) PCT Pub. No.: WO2023/095338
PCT Pub. Date: Jun. 1, 2023

(65) Prior Publication Data
US 2024/0261900 A1 Aug. 8, 2024

(51) Int. Cl.
*B23K 26/342* (2014.01)
*B22F 10/25* (2021.01)
(Continued)

(52) U.S. Cl.
CPC ............ *B23K 26/342* (2015.10); *B22F 10/25* (2021.01); *B22F 10/28* (2021.01); *B22F 10/85* (2021.01);
(Continued)

(58) Field of Classification Search
CPC .. B23K 26/342; B23K 26/032; B23K 26/042; B23K 9/0956; B23K 26/21; B23K 26/34;
(Continued)

(56) References Cited

U.S. PATENT DOCUMENTS

| | | | |
|---|---|---|---|
| 6,995,334 B1* | 2/2006 | Kovacevic | B22F 10/25 |
| | | | 219/121.64 |
| 11,872,657 B2* | 1/2024 | Sakurai | B23K 31/125 |

(Continued)

FOREIGN PATENT DOCUMENTS

| | | |
|---|---|---|
| CN | 102785045 A | 11/2012 |
| JP | H10-216940 A | 8/1998 |
| JP | 2018-192524 A | 12/2018 |
| JP | 6921361 B1 | 8/2021 |
| WO | 2017/163429 A1 | 9/2017 |

OTHER PUBLICATIONS

Duan, Peiyong et al, "CMAC Based Modeling and Closed Loop Control of HPDD Laser Welding System," Jun. 2006, IEEE Proceeding of the 6th World Congress of Intelligent Control and Automation, pp. 3839-3843 (Year: 2006).*
(Continued)

*Primary Examiner* — Edward F Landrum
*Assistant Examiner* — Erwin J Wunderlich
(74) *Attorney, Agent, or Firm* — XSENSUS LLP

(57) ABSTRACT
An information processing apparatus includes: an image analysis unit that acquires an image of a molten pool formed on a workpiece and information on a progress direction of a machining point on the workpiece, and obtains an end point of the molten pool; and a molten pool information calculation unit that calculates a center position and a width of the molten pool using position information on the end point. An additive manufacturing apparatus includes: a control unit that adjusts a machining parameter of the additive manufacturing apparatus using a calculation result of the width of the molten pool; and a machining point correction unit that corrects a position of the machining point using a calculation result of the center position of the molten pool such that the molten pool having a center position matching a program command position that is based on a machining program is formed.

9 Claims, 23 Drawing Sheets

(51) Int. Cl.

| | |
|---|---|
| *B22F 10/28* | (2021.01) |
| *B22F 10/36* | (2021.01) |
| *B22F 10/368* | (2021.01) |
| *B22F 10/85* | (2021.01) |
| *B22F 12/90* | (2021.01) |
| *B23K 26/03* | (2006.01) |
| *B23K 26/042* | (2014.01) |
| *B23K 26/21* | (2014.01) |
| *B23K 26/34* | (2014.01) |
| *B33Y 10/00* | (2015.01) |
| *B33Y 30/00* | (2015.01) |
| *B33Y 50/02* | (2015.01) |

(52) U.S. Cl.
CPC ............ *B22F 12/90* (2021.01); *B23K 26/032* (2013.01); *B23K 26/042* (2015.10); *B23K 26/21* (2015.10); *B23K 26/34* (2013.01); *B33Y 10/00* (2014.12); *B33Y 30/00* (2014.12); *B33Y 50/02* (2014.12); *B22F 10/36* (2021.01); *B22F 10/368* (2021.01); *Y02P 10/25* (2015.11)

(58) Field of Classification Search
CPC ......... B22F 10/28; B22F 10/85; B22F 12/90; B22F 10/25; B22F 10/36; B22F 10/368; B33Y 10/00; B33Y 30/00; B33Y 50/02; Y02P 10/25
See application file for complete search history.

(56) References Cited

U.S. PATENT DOCUMENTS

| | | | | |
|---|---|---|---|---|
| 11,975,410 | B2* | 5/2024 | Funami | B23K 26/705 |
| 2004/0124227 | A1* | 7/2004 | Seki | B23K 31/125 |
| | | | | 228/103 |
| 2011/0240607 | A1* | 10/2011 | Stecker | B23K 15/06 |
| | | | | 219/121.16 |
| 2015/0378347 | A1* | 12/2015 | Sato | G05B 19/4063 |
| | | | | 700/193 |
| 2018/0141121 | A1* | 5/2018 | Niitani | G01J 5/004 |
| 2019/0076964 | A1* | 3/2019 | Ichinohe | B23K 26/00 |
| 2020/0242496 | A1* | 7/2020 | Salasoo | B22F 10/20 |
| 2022/0048194 | A1* | 2/2022 | Bianchi | B25J 9/1684 |
| 2023/0095329 | A1* | 3/2023 | Mizoguchi | B23K 26/38 |
| | | | | 219/121.72 |
| 2024/0428588 | A1* | 12/2024 | Kitchen | G06V 10/443 |

OTHER PUBLICATIONS

International Search Report and Written Opinion mailed on Feb. 8, 2022, received for PCT Application PCT/JP2021/043641, filed on Nov. 29, 2021, 9 pages including English Translation.
Notice of Reasons for Refusal mailed on May 10, 2022, received for JP Application 2022-522076, 8 pages including English Translation.
Decision to Grant mailed on Sep. 27, 2022, received for JP Application 2022-522076, 5 pages including English Translation.

* cited by examiner

FIG.31

ADDITIVE MANUFACTURING SYSTEM

CROSS-REFERENCE TO RELATED APPLICATION

This application is based on PCT filing PCT/JP2021/043641, filed Nov. 29, 2021, the entire contents of which are incorporated herein by reference.

FIELD

The present disclosure relates to an additive manufacturing system, an additive manufacturing apparatus, an information processing apparatus, and an additive manufacturing method for manufacturing a three-dimensional object.

BACKGROUND

Additive manufacturing (AM) is conventionally known as a technology for forming a three-dimensional object. Directed energy deposition (DED) is one of multiple types of additive manufacturing methods, in which an additive manufacturing apparatus manufactures an object by locally melting a material with a heat source such as a laser beam, an electron beam, or an arc, and stacking beads which are solidified products of molten material. Energy of the heat source is absorbed by the workpiece, whereby a molten pool is formed on the workpiece. The additive manufacturing apparatus forms a bead bonded to the workpiece by depositing a melt, i.e. material in a molten state, on the molten pool.

In additive manufacturing, an error may occur between the target shape of the object and the actual shape of the object. The first factor that causes the error is the influence of energy distribution on the workpiece. In an additive manufacturing apparatus that melts the material with a beam emitted from the machining head, a part of the beam emitted toward the machining point may be blocked by the material fed to the machining point. The blockage of a part of the beam makes the distribution of energy received by the workpiece asymmetric with respect to the center of the beam, so that the center of the formed molten pool may be displaced from the center of the beam. As the center of the molten pool is displaced, the position at which the melt is deposited is displaced, resulting in displacement of the position of the bead constituting the object. This causes an error between the target shape of the object and the actual shape of the object.

The second factor that causes the error between the target shape and the actual shape is the influence of surface tension associated with the deposit of melt. When forming beads adjacent to each other, the beads may be deformed and attracted to each other by the action of surface tension at the interface between the beads before the beads are completely solidified. The beads formed by the deformed melt are stacked, resulting in an error between the target shape of the object and the actual shape of the object.

Patent Literature 1 discloses an automatic welding system for arc welding with wire. Specifically, the automatic welding system corrects the position of the welding torch based on an image of a molten pool, an arc, and a wire supplied from the welding torch, thereby controlling the position of the welding torch such that welding is performed along the welding line. The automatic welding system disclosed in Patent Literature 1 detects, from the image, the position of the ends of the molten pool in the horizontal direction of the image, and obtains the center position of the molten pool from the position of the ends of the molten pool. The automatic welding system disclosed in Patent Literature 1 corrects the position of the welding torch in the horizontal direction such that the center position of the molten pool matches a reference position set in advance.

CITATION LIST

Patent Literature

Patent Literature 1: Japanese Patent Application Laid-open No. 2018-192524

SUMMARY OF INVENTION

Problem to be Solved by the Invention

In additive manufacturing, machining is often performed by changing the progress direction of the machining point on the workpiece, for example, changing the progress direction of the machining head along a machining path having a curvature. In the method for correcting the position of the welding torch disclosed in Patent Literature 1, the progress direction is not considered when the position of the ends of the molten pool is detected; therefore, the accurate position of the ends of the molten pool cannot be detected when the progress direction of the machining point changes. Therefore, applying the method disclosed in Patent Literature 1 to the position correction of the machining point in additive manufacturing is problematic in that the position of the machining point cannot be accurately corrected such that the shape of the object approaches the target shape, and it is difficult to manufacture the object with high accuracy in shape.

The present disclosure has been made in view of the above, and an object thereof is to obtain an additive manufacturing system capable of manufacturing an object with high accuracy in shape.

Means to Solve the Problem

In order to solve the above-described problem and achieve the object, an additive manufacturing system according to the present disclosure includes: an additive manufacturing apparatus that manufactures an object by adding a material melted by radiation of a beam to a workpiece; and an information processing apparatus capable of communicating with the additive manufacturing apparatus. The information processing apparatus includes: an image analysis unit that acquires an image of a molten pool formed on a workpiece and information on a progress direction of a machining point on the workpiece, and obtains an end point of the molten pool based on the image and the progress direction; and a molten pool information calculation unit that calculates a center position of the molten pool and a width of the molten pool using position information on the end point. The additive manufacturing apparatus includes: a molten pool width control unit that adjusts a machining parameter of the additive manufacturing apparatus using a calculation result of the width of the molten pool such that the molten pool having a width matching a target value of the width of the molten pool is formed; and a machining point correction unit that corrects a position of the machining point using a calculation result of the center position of the molten pool such that the molten pool having a center position matching a program command position that is based on a machining program is formed.

Effects of the Invention

The additive manufacturing system according to the present disclosure can achieve the effect of manufacturing an object with high accuracy in shape.

BRIEF DESCRIPTION OF DRAWINGS

FIG. 31 is a diagram for explaining processing in the molten pool information calculation unit provided in the information processing apparatus of the additive manufacturing system according to the fourth embodiment.

DESCRIPTION OF EMBODIMENTS

Hereinafter, an additive manufacturing system, an additive manufacturing apparatus, an information processing apparatus, and an additive manufacturing method according to embodiments will be described in detail with reference to the drawings. The term additive manufacturing apparatus may be referred to or regarded as an additive manufacturer.

First Embodiment

Figure 1:
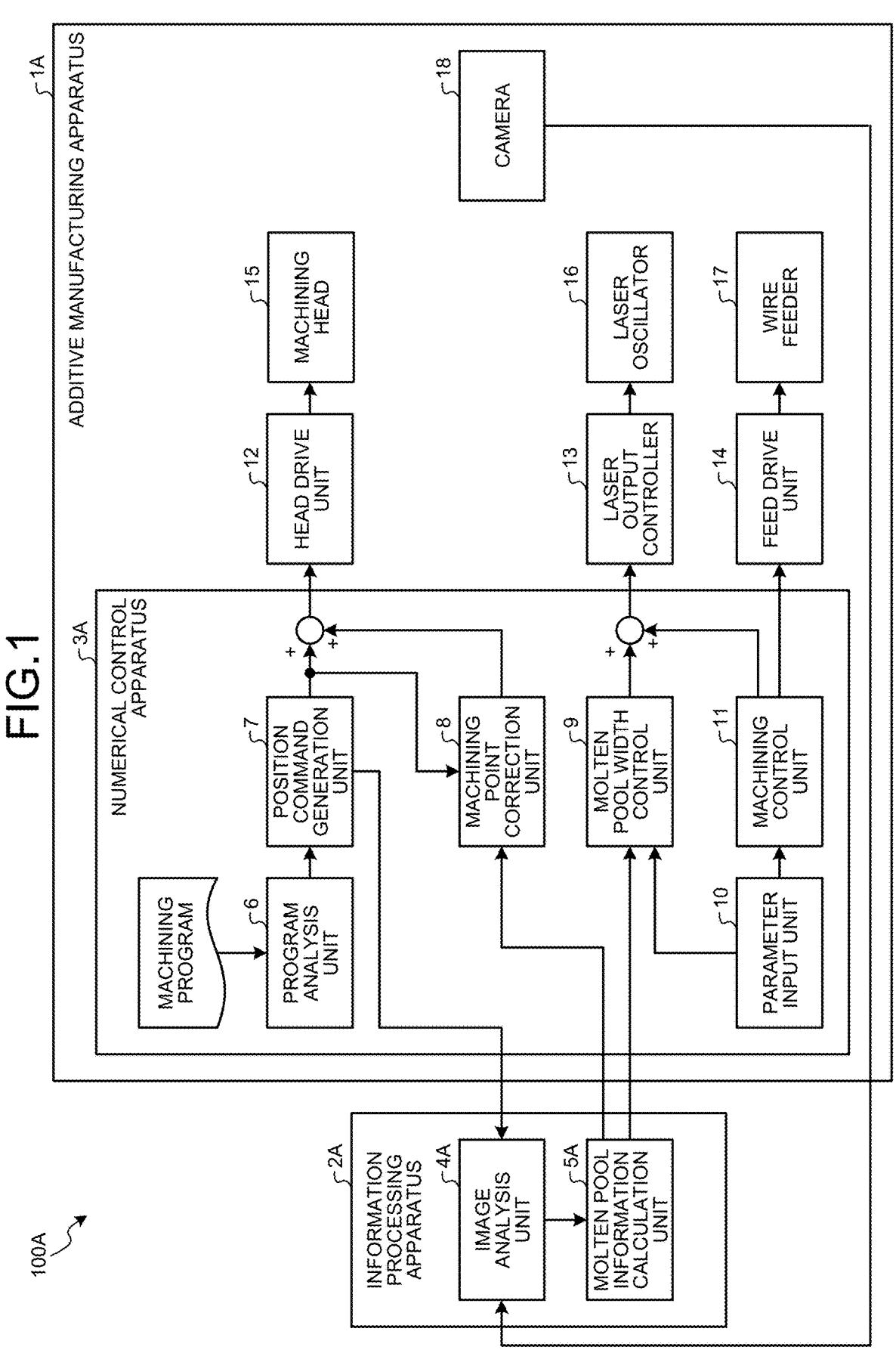
FIG. 1 is a diagram illustrating a configuration of an additive manufacturing system according to a first embodiment.

FIG. 1 is a diagram illustrating a configuration of an additive manufacturing system 100A according to the first embodiment. The additive manufacturing system 100A includes an additive manufacturing apparatus 1A and an information processing apparatus 2A capable of communicating with the additive manufacturing apparatus 1A. The additive manufacturing apparatus 1A is a machine tool that manufactures an object having a solid shape through additive manufacturing. The additive manufacturing apparatus 1A includes a numerical control apparatus 3A that controls the additive manufacturing apparatus 1A.

Figure 2:
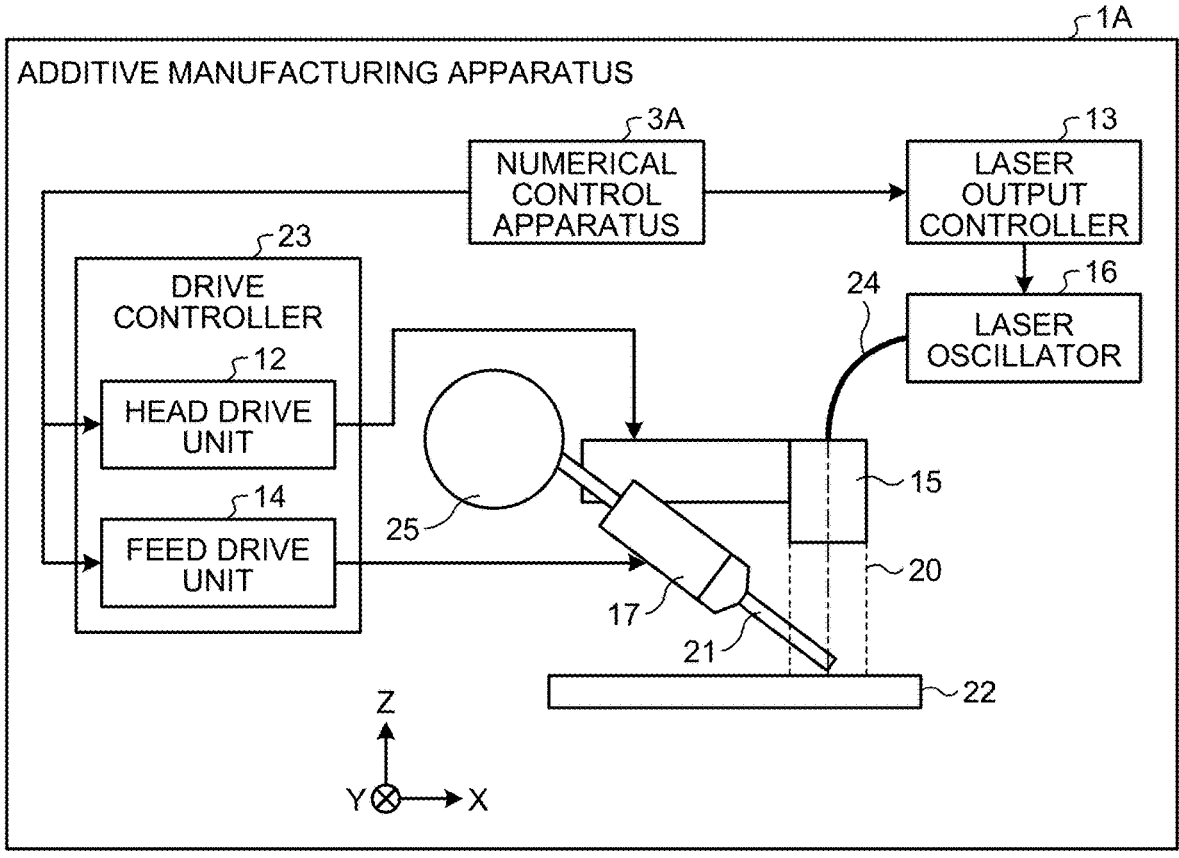
FIG. 2 is a diagram illustrating a configuration of the additive manufacturing apparatus constituting the additive manufacturing system according to the first embodiment.

FIG. 2 is a diagram illustrating a configuration of the additive manufacturing apparatus 1A constituting the additive manufacturing system 100A according to the first embodiment. The additive manufacturing apparatus 1A manufactures an object by adding a material melted by radiation of a beam to a workpiece. In the first embodiment, the beam that is a heat source is a laser beam 20, and the material is a wire 21 made of metal.

The additive manufacturing apparatus 1A is a DED-type additive manufacturing apparatus. Note that the heat source is not limited to the laser beam 20. The heat source may be a beam other than the laser beam 20 or may be an electron beam. As the heat source, an arc may be used instead of a beam. The material is not limited to the wire 21, and may be metal powder.

The additive manufacturing apparatus 1A locally melts the leading end portion of the wire 21 fed to the workpiece with the laser beam 20 to deposit the melt of the wire 21 on a machining point on the workpiece, thereby forming a bead bonded to the workpiece. The bead is a solidified product of molten material. The machining point represents the position of the workpiece at which machining is performed. Energy of the laser beam 20 is absorbed by the machining point on the workpiece, whereby a molten pool is formed at the machining point. The additive manufacturing apparatus 1A moves the machining point while feeding the wire 21 to the machining point. The additive manufacturing apparatus 1A deposits a melt on the molten pool to bond the bead to the workpiece.

The additive manufacturing apparatus 1A manufactures an object by stacking beads on a base material 22. The base material 22 illustrated in FIG. 2 is a plate material. The base material 22 may be a material other than a plate material. The workpiece is a material to which a melt is added, specifically the base material 22 or a bead on the base material 22. The X axis, the Y axis, and the Z axis are three axes perpendicular to each other. The X axis and the Y axis are horizontal axes. The Z axis is a vertical axis. Beads are stacked in the Z-axis direction. The arrow direction of the X-axis direction is referred to as the plus X direction, and the direction opposite to the plus X direction is referred to as the minus X direction. The arrow direction of the Y-axis direction is referred to as the plus Y direction, and the direction opposite to the plus Y direction is referred to as the minus Y direction. The arrow direction of the Z-axis direction is referred to as the plus Z direction, and the direction opposite to the plus Z direction is referred to as the minus Z direction.

A laser oscillator 16 that is a beam source outputs the laser beam 20. The laser beam 20 output from the laser oscillator 16 is propagated to a machining head 15 through a fiber cable 24 which is an optical transmission line.

The machining head 15 emits the laser beam 20 to the workpiece. A collimating optical system that collimates the laser beam 20 and a condenser lens that focuses the laser beam 20 on the workpiece are provided inside the machining head 15. The collimating optical system and the condenser lens are not illustrated. The direction of the center line of the laser beam 20 with which the workpiece is irradiated is the Z-axis direction. The axis of the machining head 15 matches the center line of the laser beam 20. The machining point is the point on the workpiece intersecting the axis of the machining head 15. The additive manufacturing apparatus 1A includes an actuator that is a drive system that causes the machining head 15 to progress in each of the X-axis direction, the Y-axis direction, and the Z-axis direction. The actuator is not illustrated.

The machining head 15 ejects a shielding gas toward the workpiece. As the shielding gas, argon gas which is an inert gas is used. The additive manufacturing apparatus 1A reduces or prevents oxidation of beads and cools the formed beads by ejecting the shielding gas. The shielding gas is supplied from a gas cylinder which is a supply source of the shielding gas. The gas cylinder is not illustrated.

A wire spool 25 is a supply source of the wire 21. The wire spool 25 is attached to the additive manufacturing apparatus 1A with the wire 21 wound around the wire spool 25. A wire feeder 17 is a feeding unit that feeds the wire 21 to the workpiece. The wire feeder 17 performs an operation of feeding the wire 21 toward the machining point and an operation of pulling back the fed wire 21 toward the wire spool 25. The direction in which the wire 21 is fed is a direction oblique to the Z-axis direction in which the laser beam 20 is emitted from the machining head 15. The wire feeder 17 is supported by the machining head 15. The wire feeder 17 moves integrally with the machining head 15. Note that only the nozzle portion of the wire feeder 17 that feeds the wire 21 toward the machining point may be supported by the machining head 15. In this manner, at least a part of the wire feeder 17 is supported by the machining head 15.

The base material 22 is fixed to the machining stage. The machining stage is not illustrated. The additive manufacturing apparatus 1A changes the posture of the base material 22 by driving the machining stage. The additive manufacturing apparatus 1A moves the machining point on the workpiece by changing the posture of the base material 22 and driving the machining head 15.

A drive controller 23 includes a head drive unit 12 that drives the actuator and a feed drive unit 14 that drives the wire feeder 17. The head drive unit 12 drives the machining head 15 by driving the actuator. The drive controller 23 includes a stage drive unit that drives the machining stage. The stage drive unit is not illustrated. A laser output controller 13 adjusts the laser output of the laser oscillator 16 by controlling the laser oscillator 16.

The numerical control apparatus 3A outputs various commands for controlling the additive manufacturing apparatus 1A. The numerical control apparatus 3A sends a position command which is a command for controlling the machining head 15 to the head drive unit 12. The numerical control apparatus 3A sends a feed command which is a command for controlling the feeding of the wire 21 to the feed drive unit 14. The numerical control apparatus 3A sends a beam output command which is a command for controlling the output of the beam from the beam source to the laser output controller 13. In the following description, beam output commands are referred to as laser output commands. The head drive unit 12 drives the machining head 15 by driving the actuator according to the position command. The feed drive unit 14 drives the wire feeder 17 according to the feed command. The laser output controller 13 controls the laser oscillator 16 according to the laser output command.

The additive manufacturing apparatus 1A includes a camera 18 that is a visible light camera. The camera 18 captures an image of the molten pool. In FIG. 2, the camera 18 is not illustrated. The camera 18 may be used to observe the object or beads. The additive manufacturing apparatus 1A may include a thermometer that measures the temperature of the object, the temperature of the workpiece, or the temperature of the molten pool. The thermometer is a radiation thermometer, a thermo camera, or the like. The additive manufacturing apparatus 1A may include a shape measuring device that measures the shape of the object or the shape of beads. The shape measuring device is a measuring device such as a laser displacement meter, a contact displacement sensor, or an optical coherence tomography (OCT) system for optical coherence tomography. The additive manufacturing apparatus 1A may include a sensor unit including the camera 18, a thermometer, and a shape measuring device. The sensor unit may include other devices for various measurements, for example, a spectroscope, an acoustic measuring device, and the like.

Note that FIG. 1 illustrates, in the additive manufacturing apparatus 1A, only the machining head 15, the laser oscillator 16, and the wire feeder 17, and main components for use in controlling the machining head 15, the laser oscillator 16, and the wire feeder 17. In FIG. 1, other components of the additive manufacturing apparatus 1A are not illustrated.

The numerical control apparatus 3A includes a program analysis unit 6 that analyzes a machining program input to the numerical control apparatus 3A, a position command generation unit 7 that generates a position command, a machining point correction unit 8 that corrects the position of the machining point, a molten pool width control unit 9 that controls the width of the molten pool by adjusting a machining parameter, a parameter input unit 10 to which machining parameters are input, and a machining control unit 11 that generates a laser output command and a feed command.

The program analysis unit 6 obtains a machining path which is a path for moving the machining point based on the description of the machining program. The program analysis unit 6 determines the end point coordinates of each machining path specified by the machining program, and outputs information of the end point coordinates of each machining path to the position command generation unit 7.

The position command generation unit 7 interpolates the machining path to the end point coordinates according to the control cycle of the numerical control apparatus 3A, and generates a position command that is an interpolation point group. Hereinafter, the position of each interpolation point of the interpolation point group is referred to as a program command position. The position command generation unit 7 outputs the position command. The position command generation unit 7 also calculates the machining progress direction based on the interpolation result. The position command generation unit 7 outputs information of the machining progress direction. The machining progress direction is the progress direction of the machining point on the workpiece.

Machining parameters representing the content of various machining conditions are input to the parameter input unit 10 by the user of the additive manufacturing system 100A. The target value of the width of the molten pool is input to the parameter input unit 10. The machining control unit 11 generates a laser output command and a feed command based on the machining parameters input to the parameter input unit 10. The machining control unit 11 outputs the laser output command and the feed command. Note that machining parameter information may be described in the machining program, in which case the machining control unit 11 may generate a laser output command and a feed command based on the machining parameter information read by the program analysis unit 6.

Information of the center position of the molten pool is input to the machining point correction unit 8 from the information processing apparatus 2A. The position command generated by the position command generation unit 7 is input to the machining point correction unit 8. The machining point correction unit 8 corrects the position of the machining point using the information of the center position of the molten pool such that the molten pool having a center position matching the program command position is formed. The machining point correction unit 8 corrects the position of the machining point by calculating a correction amount for moving the machining point from the center position of the molten pool to the program command position. The numerical control apparatus 3A outputs the position command corrected by the addition of the correction amount to the head drive unit 12.

The calculation result of the width of the molten pool is input to the molten pool width control unit 9 from the information processing apparatus 2A. The target value of the width of the molten pool is input to the molten pool width control unit 9 from the parameter input unit 10. The molten pool width control unit 9 adjusts a machining parameter using information of the width of the molten pool such that the molten pool having a width matching the target value of the width of the molten pool is formed. In the configuration illustrated in FIG. 1, the molten pool width control unit 9 adjusts the machining parameter indicating laser output. The molten pool width control unit 9 adjusts the machining parameter by calculating an adjustment amount of laser output for matching the width of the molten pool with the target value. The numerical control apparatus 3A outputs, to the laser output controller 13, the laser output command with the value of laser output adjusted by the addition of the adjustment amount.

Note that the molten pool width control unit 9 may adjust the machining parameter indicating moving speed such that the molten pool having a width matching the target value is formed. The moving speed is the speed at which the machining point is moved on the machining path. In this case, the molten pool width control unit 9 adjusts the machining parameter by calculating an adjustment amount of moving speed for matching the width of the molten pool with the target value. The numerical control apparatus 3A outputs, to the head drive unit 12, the position command with the program command position adjusted by the addition of the adjustment amount.

The information processing apparatus 2A processes information about a molten pool that is formed on the workpiece in additive manufacturing. The information processing apparatus 2A includes an image analysis unit 4A that performs image analysis, and a molten pool information calculation unit 5A that calculates molten pool information. The molten pool information includes information on the center position of the molten pool and information on the width of the molten pool.

Information of the machining progress direction is input from the position command generation unit 7 to the image analysis unit 4A. An image captured by the camera 18 is input to the image analysis unit 4A. The image analysis unit 4A acquires an image of the molten pool formed on the workpiece from the camera 18. The image analysis unit 4A obtains end points of the molten pool from the image of the molten pool. Processing for obtaining end points of the molten pool will be described later. The image analysis unit 4A outputs position information of the end points of the molten pool.

The position information on the end points of the molten pool is input to the molten pool information calculation unit 5A. The molten pool information calculation unit 5A calculates the center position of the molten pool and the width of the molten pool using the position information on the end points. Processing for calculating the center position of the molten pool and processing for calculating the width of the molten pool will be described later. The molten pool information calculation unit 5A outputs the calculation result of the center position of the molten pool and the calculation result of the width of the molten pool.

In additive manufacturing, an error may occur between the target shape of the object and the actual shape of the object. Here, two factors that can cause an error between the target shape and the actual shape will be described. Hereinafter, the first factor will be described with reference to FIGS. 3 to 5. The first factor is the influence of energy distribution on the workpiece.

Figure 3:
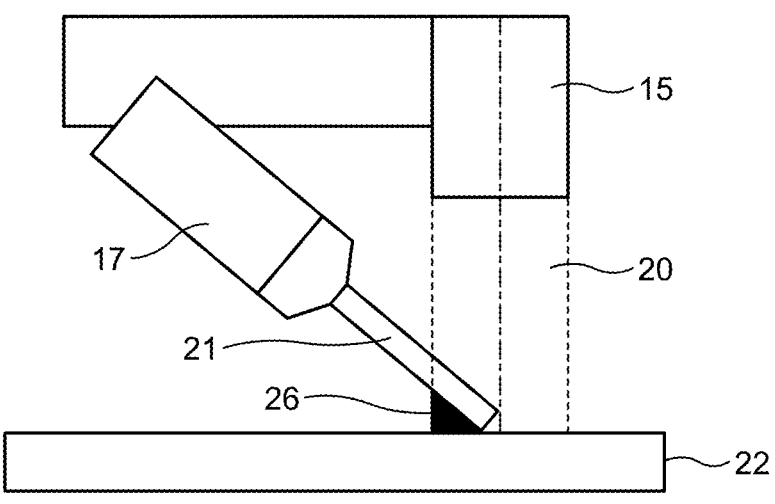
FIG. 3 is a diagram illustrating the machining head and the wire feeder constituting the additive manufacturing apparatus of the additive manufacturing system according to the first embodiment.
Figure 3:
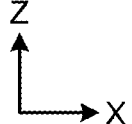

FIG. 3 is a diagram illustrating the machining head 15 and the wire feeder 17 constituting the additive manufacturing apparatus 1A of the additive manufacturing system 100A according to the first embodiment. FIG. 3 illustrates the machining head 15 and the wire feeder 17 as viewed during machining from a position in the minus Y direction relative to the machining head 15.

In FIG. 3, the direction in which the wire 21 is fed is an oblique direction between the minus Z direction and the plus X direction. A part of the laser beam 20 emitted from the machining head 15 toward the machining point is blocked by the wire 21 fed from the wire feeder 17. Therefore, there is a region 26 where the laser beam 20 is blocked at a position in the minus X direction relative to the center line of the laser beam 20.

Figure 4:
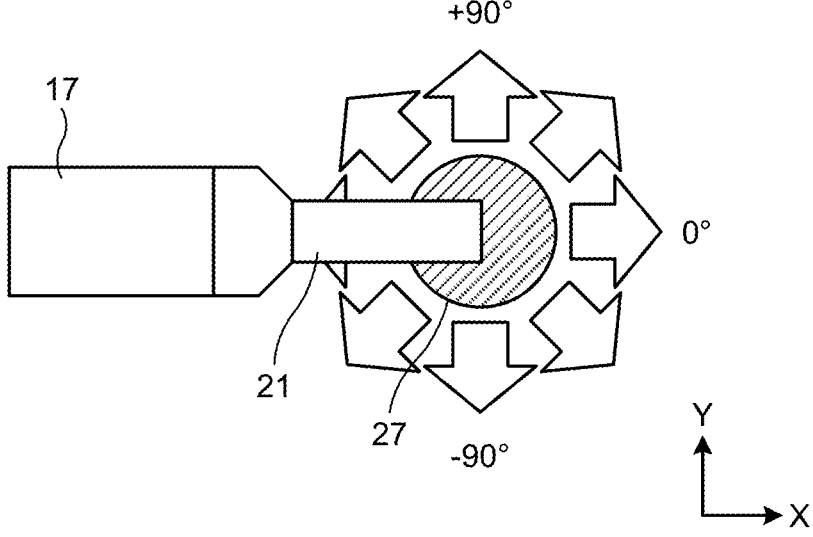
FIG. 4 is a diagram for explaining the progress direction of the machining head illustrated in FIG. 3.

FIG. 4 is a diagram for explaining the progress direction of the machining head 15 illustrated in FIG. 3. FIG. 4 illustrates the wire feeder 17 and the wire 21 as viewed from a position in the plus Z direction relative to the machining head 15. In FIG. 4, hollow arrows indicate examples of the progress direction of the machining head 15 with respect to the workpiece. FIG. 4 does not illustrate the machining head 15. FIG. 4 illustrates a spot 27 of the laser beam 20 on the workpiece.

Here, the machining progress direction in the two-dimensional direction of the X-axis direction and the Y-axis direction is represented by an angle. The machining progress direction is represented by an angle in the range of +180° to −180° with respect to the plus X direction. The plus X direction is expressed as 0°. The plus Y direction is expressed as +90°. The minus Y direction is expressed as −90°.

Figure 5:
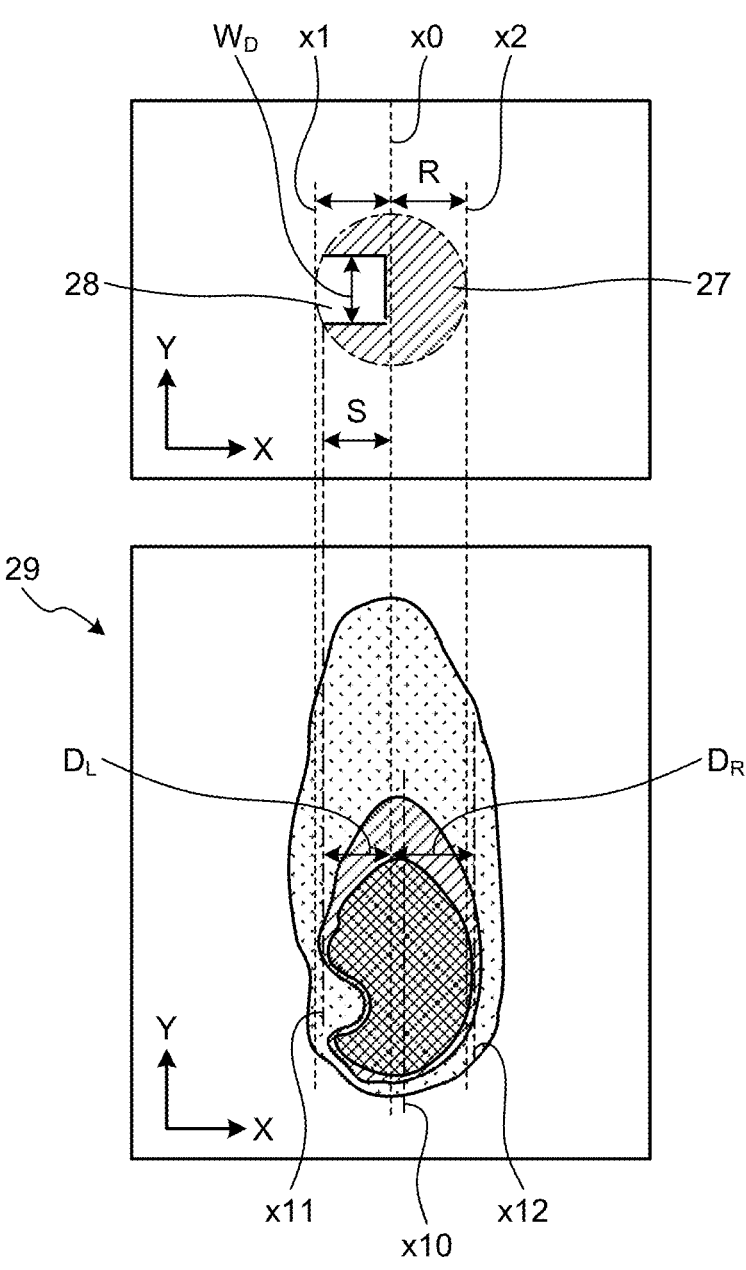
FIG. 5 is a diagram illustrating an example of the spot of the laser beam emitted from the machining head illustrated in FIG. 3 and a temperature distribution on the workpiece.

FIG. 5 is a diagram illustrating an example of the spot 27 of the laser beam 20 emitted from the machining head 15 illustrated in FIG. 3 and a temperature distribution 29 on the workpiece. The lower part of FIG. 5 illustrates the result of simulation of the temperature distribution 29 on the workpiece when the spot 27 illustrated in the upper part of FIG. 5 progresses in the minus Y direction. The temperature distribution 29 illustrated in FIG. 5 consists of a hollow portion, a dot pattern portion, a hatched portion, and a shaded portion, in descending order of temperature. The temperature distribution 29 can be regarded as the energy distribution of the laser beam 20 incident on the workpiece.

A shadow 28 of the wire 21 is formed on the minus X direction side from the center x0 of the laser beam 20 in the X-axis direction. The width of the shadow 28 in the Y-axis direction is assumed to be equal to the width $W_D$ of the wire 21. The spot 27 is a circular region with a radius of R excluding the portion corresponding to the shadow 28. The formation of the shadow 28 results in the spot 27 having a bilaterally asymmetric shape with respect to the center x0.

The position x1 is the end of the circular region on the minus X direction side. The position x2 is the end of the circular region on the plus X direction side. The formation of the shadow 28 makes the distance S between the center x0 and the end of the spot 27 on the minus X direction side shorter than the radius R. The distance S is obtained with Formula (1) below.

$$S = \{R^2 - (W_D/2)^2\}^{0.5} \tag{1}$$

Because the shadow 28 is formed on the minus X direction side relative to the center x0, the area of the portion of the spot 27 on the minus X direction side relative to the center x0 is smaller than the area of the portion of the spot 27 on the plus X direction side relative to the center x0. Therefore, the region having high energy on the workpiece is biased toward the plus X direction side relative to the center x0. The center x10 of the molten pool in the X-axis direction is displaced from the center x0 of the spot 27 in the plus X direction due to the biased energy distribution.

The position x11 is the end of the molten pool on the minus X direction side. The position x12 is the end of the molten pool on the plus X direction side. Letting $D_L$ represent the distance between the center x0 and the position x11 and $D_R$ represent the distance between the center x0 and the position x12, $D_L < D_R$ holds. In addition, $S \approx D_L$ holds.

A melt of the wire 21 is deposited on the molten pool, whereby a bead is formed at the position of the molten pool. As the center x10 of the molten pool is displaced from the center x0 of the laser beam 20, the position at which the bead is formed is also displaced. Sequential stacking of such beads results in displacement of the object from the position specified by the design, even with the process of matching the center x0 of the laser beam 20 with the machining path. This causes an error between the target shape of the object and the actual shape of the object.

Next, the second factor that may cause an error between the target shape and the actual shape will be described with reference to FIG. 6. The second factor is the influence of surface tension associated with the deposit of melt.

Figure 6:
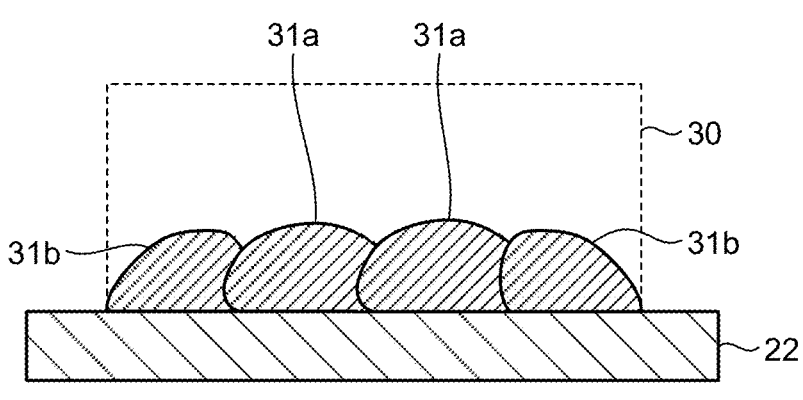
FIG. 6 is a diagram illustrating an example of an object manufactured with the additive manufacturing apparatus of the additive manufacturing system according to the first embodiment.
Figure 6:
Figure 6:
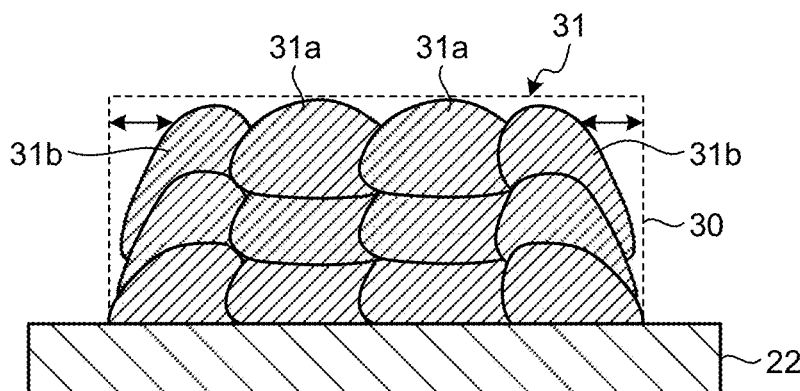

FIG. 6 is a diagram illustrating an example of an object manufactured with the additive manufacturing apparatus 1A of the additive manufacturing system 100A according to the first embodiment. FIG. 6 illustrates an example case of manufacturing a block which is a rectangular parallelepiped object by stacking layers of a plurality of beads aligned. Each bead illustrated in FIG. 6 is formed by moving the machining head 15 in the direction perpendicular to the paper surface of FIG. 6.

When beads adjacent to each other are formed, the beads may be deformed and attracted to each other by the action of surface tension at the interface between the beads, before the beads are completely solidified. The upper part of FIG. 6 illustrates formation of a layer consisting of four beads on the base material 22. Two beads 31*a* out of the four beads are located at the center of the layer. Two beads 31*b* out of the four beads are located at the ends of the layer. Each bead 31*b* is deformed toward the adjacent bead 31*a* due to surface tension.

The lower part of FIG. 6 illustrates formation of an object by stacking the second layer and the third layer on the first layer, which is the layer illustrated in the upper part of FIG. 6. The second layer and the third layer each include four beads similarly to the first layer. In both the second layer and the third layer, the beads 31*b* at the ends are deformed as in the first layer. In addition, because the second layer is stacked on the deformed first layer, the beads 31*b* in the second layer are also affected by the deformation of the first layer. Therefore, the degree of deformation of the beads 31*b* in the second layer is larger than that of the beads 31*b* in the first layer. The beads 31*b* in the third layer are affected by the deformation of the second layer, and thus have a larger degree of deformation than the beads 31*b* in the second layer. In this manner, the higher the layer is from the base material 22, the greater the degree of deformation of the beads 31*b*.

The deformation of the beads 31*b* in each layer causes an error between the shape of a block 31 actually formed and the target shape, i.e. the design shape of a block 30. In the lower part of FIG. 6, double-headed arrows represent errors between the design shape of the block 30 and the shape of the block 31, which is the actual object. The shape of the block 31 deviates from the target shape as illustrated in the lower part of FIG. 6: the higher the layer is from the base material 22, the narrower the width of the block 31 in the direction in which beads are arranged in each layer. The block 31 has a tapered shape toward its highest portion from the base material 22. Thus, even with the feeding of a sufficient volume of the wire 21 to form the designed object, the shape accuracy of the object deteriorates due to the deformation of beads constituting the object.

The additive manufacturing system 100A reduces the error between the target shape and the actual shape by correcting the position of the machining point such that the center position of the molten pool matches the program command position and adjusting the machining parameters such that the width of the molten pool matches the target value. Thus, the additive manufacturing system 100A can manufacture an object with high accuracy in shape.

Figure 7:
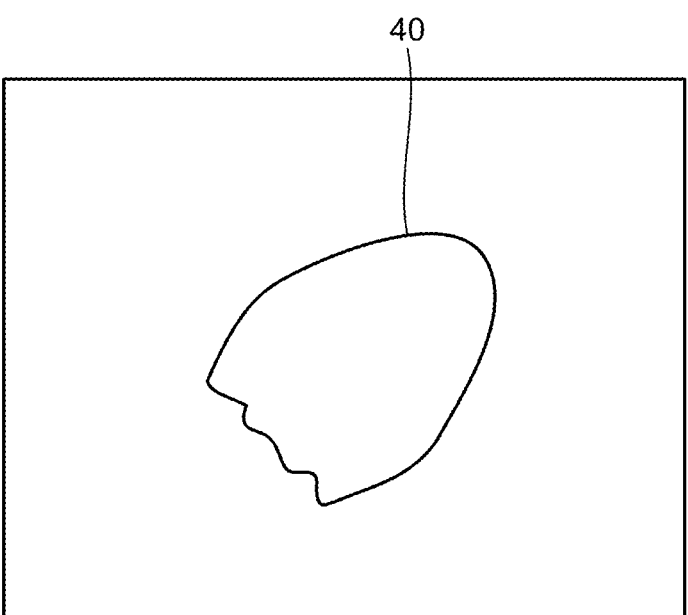
FIG. 7 is a first diagram for explaining processing in the image analysis unit provided in the information processing apparatus of the additive manufacturing system according to the first embodiment.

Next, processing in the information processing apparatus 2A will be described in detail. FIG. 7 is a first diagram for explaining processing in the image analysis unit 4A provided in the information processing apparatus 2A of the additive manufacturing system 100A according to the first embodiment. The camera 18 captures an image of a molten pool 40 after a lapse of a certain time from the start of irradiation of the machining point with the laser beam 20. The image analysis unit 4A extracts the contour of the molten pool 40 from the image captured by the camera 18. FIG. 7 illustrates an example of the extracted contour. Any image processing technique such as binarization or contour extraction can be used to extract the contour of the molten pool 40.

Figure 8:
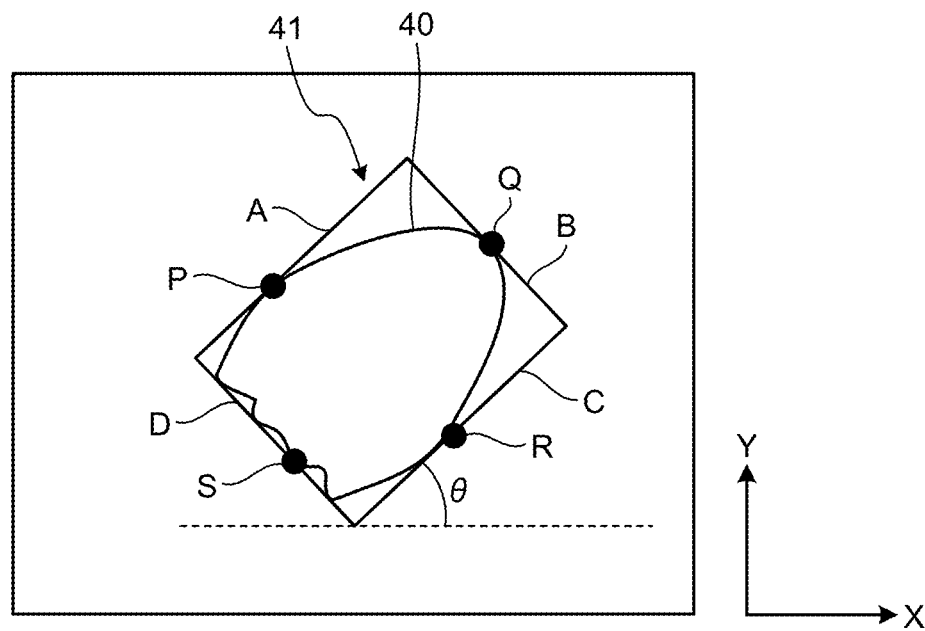
FIG. 8 is a second diagram for explaining processing in the image analysis unit provided in the information processing apparatus of the additive manufacturing system according to the first embodiment.

FIG. 8 is a second diagram for explaining processing in the image analysis unit 4A provided in the information processing apparatus 2A of the additive manufacturing system 100A according to the first embodiment. The image analysis unit 4A obtains end points of the molten pool 40 based on the extracted contour. An end point is a contact point between a rectangle 41 circumscribing the molten pool 40 and the contour of the molten pool 40. In this manner, the image analysis unit 4A obtains end points of the molten pool 40 based on the image of the molten pool 40. FIG. 8 illustrates the rectangle 41 and end points obtained based on the contour of the molten pool 40 together with the contour of the molten pool 40 illustrated in FIG. 7.

The first embodiment is based on the assumption that the X axis and the Y axis serving as positional references in the additive manufacturing apparatus 1A are also used to represent positions on the workpiece. The coordinate system for representing positions on the image is assumed to be the same as the coordinate system for representing positions on the workpiece. The machining progress direction is represented by an angle relative to the plus X direction, which is the direction of 0° illustrated in FIG. 4. Here, the machining progress direction at the time of capturing the molten pool 40 is assumed to be +θ°.

The image analysis unit 4A sets the same direction as the machining progress direction for the directions of two sides of the rectangle 41 based on the information of the machining progress direction acquired from the position command generation unit 7. The image analysis unit 4A sets the rectangle 41 having side A and side C which are two sides parallel to the machining progress direction, and side B and side D which are two sides perpendicular to both side A and side C. Side B is a side located ahead in the machining progress direction among the two sides perpendicular to both side A and side C. Side D is a side located the rear in the machining progress direction among the two sides perpendicular to both side A and side C. As a result, the image analysis unit 4A sets the rectangle 41 inclined by +θ° with respect to the X axis.

The image analysis unit 4A further obtains an end point P on side A, an end point Q on side B, an end point R on side C, and an end point S on side D. The image analysis unit 4A outputs coordinates which are position information on each of the end points P, Q, R, and S.

Figure 9:
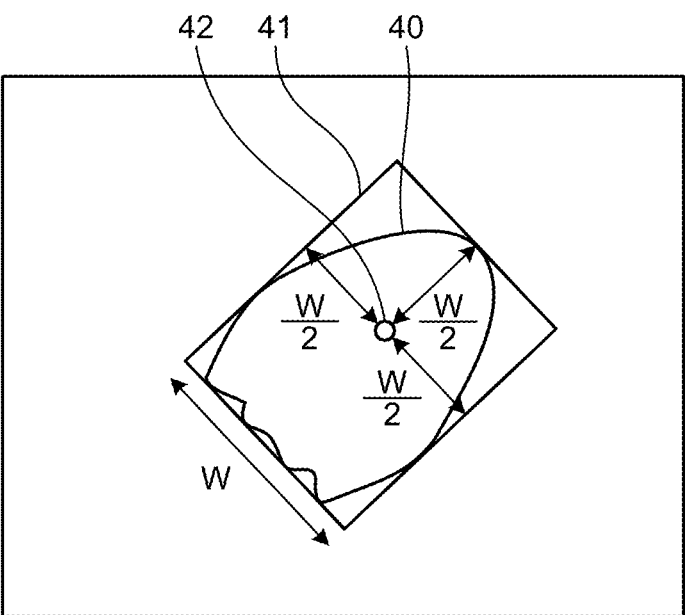
FIG. 9 is a diagram for explaining processing in the molten pool information calculation unit provided in the information processing apparatus of the additive manufacturing system according to the first embodiment.

FIG. 9 is a diagram for explaining processing in the molten pool information calculation unit 5A provided in the information processing apparatus 2A of the additive manufacturing system 100A according to the first embodiment. Position information on each of the end points P, Q, R, and S is input to the molten pool information calculation unit 5A. The molten pool information calculation unit 5A obtains the width W of the molten pool 40 and a center point 42, i.e. the center position of the molten pool 40, based on the position information of each of the end points P, Q, R, and S.

In the first embodiment, the width W of the molten pool 40 is defined as the distance between side A and side C. The center point 42, which is the center position of the molten pool 40, is defined as the point at a distance of W/2 from each of side A, side B, and side C. With the width W and the center point 42 defined in this manner, the width W and the center point 42 can be calculated from geometrical relationships using the coordinates of the end points P, Q, R, and S and the machining progress direction. The molten pool information calculation unit 5A outputs the value indicating the calculation result of the width W and the coordinates indicating the calculation result of the center point 42.

Figure 10:
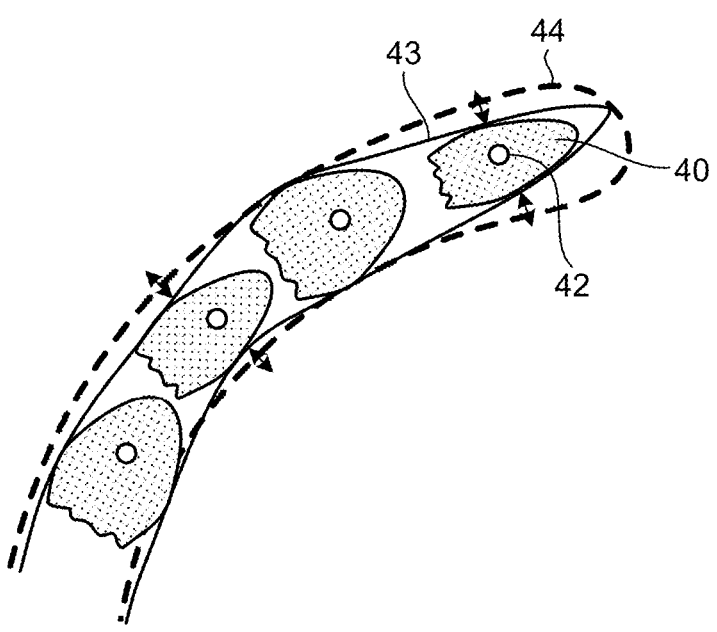
FIG. 10 is a diagram for explaining processing in the molten pool width control unit provided in the additive manufacturing apparatus of the additive manufacturing system according to the first embodiment.

Next, processing in the numerical control apparatus 3A of the additive manufacturing apparatus 1A will be described in detail. FIG. 10 is a diagram for explaining processing in the molten pool width control unit 9 provided in the additive manufacturing apparatus 1A of the additive manufacturing system 100A according to the first embodiment.

FIG. 10 schematically represents a plurality of molten pools 40 continuously formed by the movement of the machining point, a shape 43 of the formed bead, and a target shape 44. FIG. 10 illustrates a state in which the molten pools 40 having a width smaller than the target value are formed, and as a result a bead partially having a width smaller than the target shape 44 of the bead is formed. Double-headed arrows illustrated in FIG. 10 represent errors between the shape 43 of the formed bead and the target shape 44. In the presence of the errors between the shape 43 of the formed bead and the target shape 44, it is difficult to reduce the error between the target shape of the object and the actual shape of the object even with the correction of the position of the machining point to be described later.

Information on the width W of the molten pool 40, that is, the value of the width W calculated by the molten pool information calculation unit 5A, is input to the molten pool width control unit 9. The molten pool width control unit 9 obtains the difference between the value of the width W and the target value of the width W. The molten pool width control unit 9 adjusts the machining parameter indicating laser output through feedback control based on the difference. The molten pool width control unit 9 adjusts the machining parameter indicating moving speed through feedback control based on the difference. Note that the molten pool width control unit 9 may adjust the machining parameters through feedforward control based on a predetermined physical model.

Figure 11:
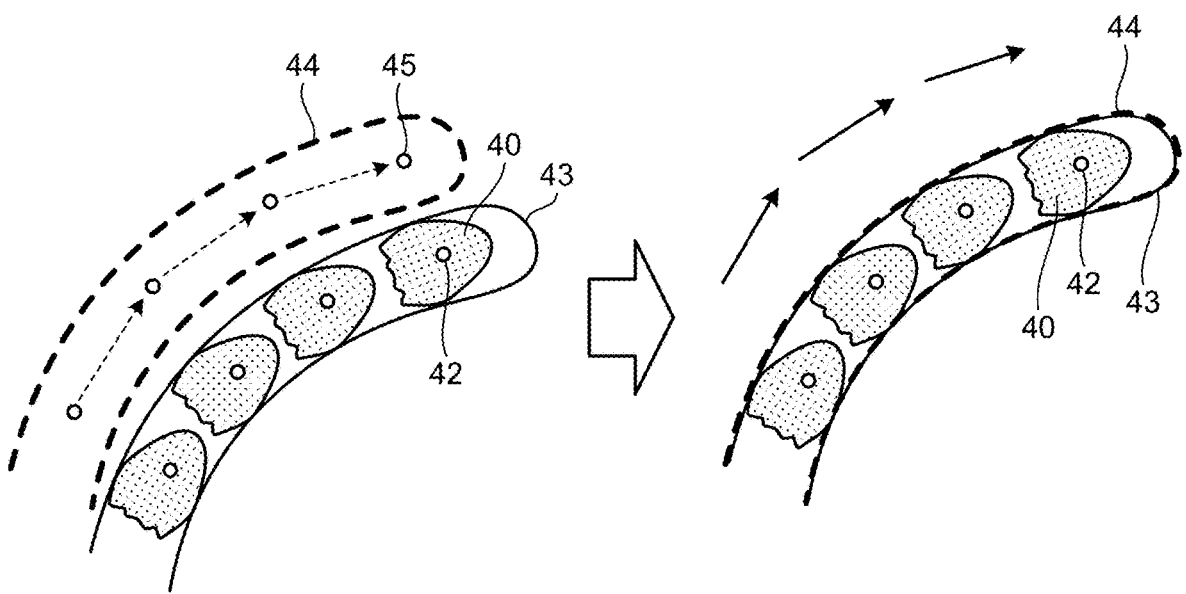
FIG. 11 is a diagram for explaining processing in the machining point correction unit provided in the additive manufacturing apparatus of the additive manufacturing system according to the first embodiment.

FIG. 11 is a diagram for explaining processing in the machining point correction unit 8 provided in the additive manufacturing apparatus 1A of the additive manufacturing system 100A according to the first embodiment. The left part of FIG. 11 schematically represents the molten pools 40 formed without the correction of the machining point according to the first embodiment, the shape 43 of the formed bead, and the target shape 44. Broken arrows illustrated in FIG. 11 represent a machining path produced without correction. The left part of FIG. 11 represents a state in which the center point 42 of the molten pool 40 is located away from the program command position 45, and as a result the bead is formed at a position away from the position of the target shape 44.

Position information on the center point 42, that is, the coordinates of the center point 42 calculated by the molten pool information calculation unit 5A, is input to the machining point correction unit 8. The position command, that is, information on the program command position 45, is also input to the machining point correction unit 8. The machining point correction unit 8 obtains a correction vector for matching the center point 42 with the program command position 45. The correction vector represents the difference between the program command position 45 and the position of the center point 42. The machining point correction unit 8 calculates the obtained correction vector as a correction amount. In this case, the machining point correction unit 8 performs correction to shift the position of the machining head 15 according to the correction amount corresponding to the correction vector. In this manner, the machining point correction unit 8 corrects the position of the machining point such that the molten pool 40 having a center position matching the program command position 45 is formed. Alternatively, the machining point correction unit 8 may correct the position of the machining point through proportional integral differential (PID) control based on the obtained correction vector.

The right part of FIG. 11 schematically represents the molten pools 40 formed with the correction of the machining point according to the first embodiment, the shape 43 of the formed bead, and the target shape 44. Solid arrows illustrated in FIG. 11 represent a machining path produced as a result of correction. The additive manufacturing apparatus 1A can form the molten pool 40 having a center position matching the program command position through the correction of the position of the machining point by the machining point correction unit 8. As a result, the additive manufacturing apparatus 1A can match the shape 43 of the formed bead with the position of the target shape 44.

Figure 12:
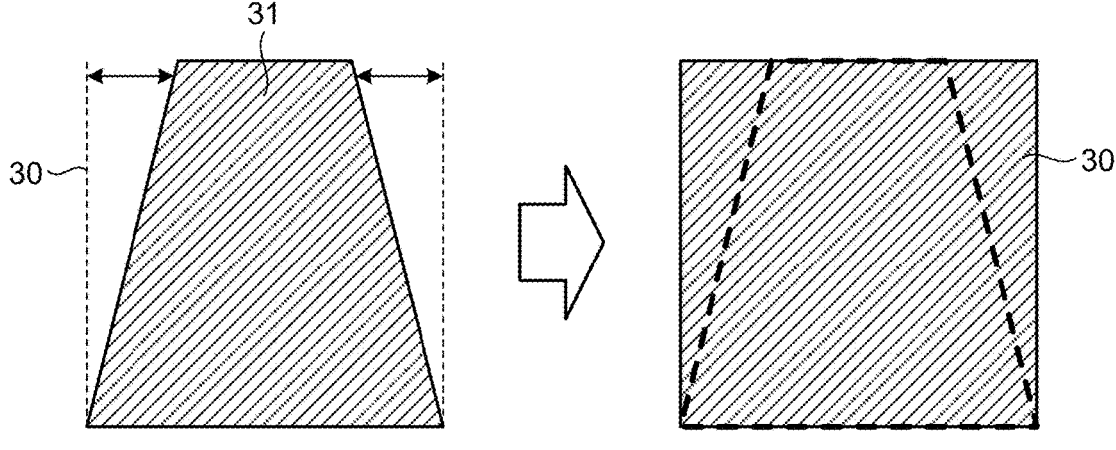
FIG. 12 is a diagram for explaining improvement of the object through the correction of the position of the machining point in the first embodiment.

FIG. 12 is a diagram for explaining improvement of the object through the correction of the position of the machining point in the first embodiment. The left part of FIG. 12 is an example of an object manufactured without the correction of the machining point according to the first embodiment, illustrating the block 31 deformed relative to the designed block 30. The right part of FIG. 12 is an example of an object manufactured with the correction of the machining point according to the first embodiment, illustrating the block 30 manufactured as designed.

As described with reference to FIG. 6, the block 31 has a tapered shape toward its highest layer from the base material 22. The additive manufacturing apparatus 1A can correct the position of the machining point in the direction that improves the tapering of the block 30, and thus can form the block 31 with less deformation relative to the target shape.

In addition, for example, when manufacturing a cylindrical object, the progress direction of the machining point always changes. When the correction of the machining point according to the first embodiment is not made, the error between the center position of the molten pool 40 and the program command position 45 always changes, resulting in deformation relative to the target shape. By correcting the machining point according to the first embodiment, it is possible to form an object with less deformation relative to the target shape. An example of manufacturing a cylindrical object is not illustrated.

Figure 13:
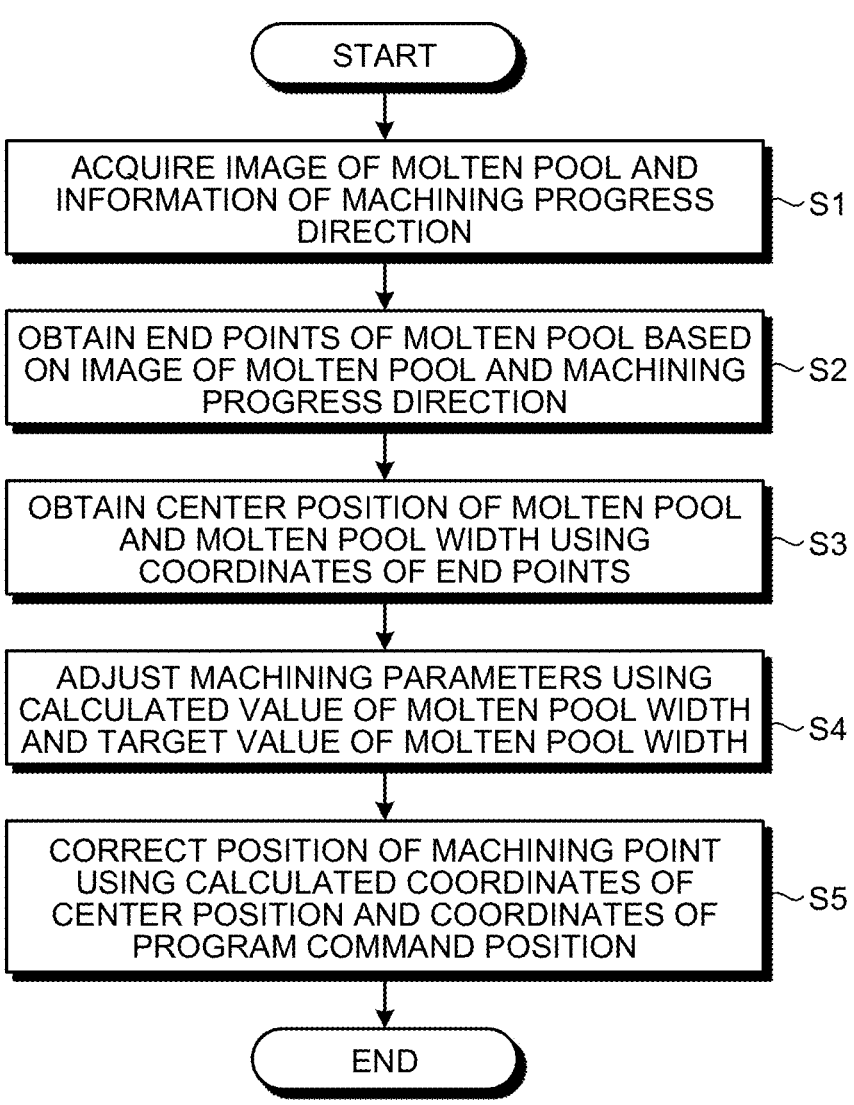
FIG. 13 is a flowchart illustrating an operation procedure for the additive manufacturing system according to the first embodiment.

Next, operation of the additive manufacturing system 100A will be described. FIG. 13 is a flowchart illustrating an operation procedure for the additive manufacturing system 100A according to the first embodiment.

Steps S1 to S3 are operation procedures for the information processing apparatus 2A in the additive manufacturing system 100A. In step S1, the image analysis unit 4A of the information processing apparatus 2A acquires an image of the molten pool 40 and information on the machining progress direction. In step S2, the image analysis unit 4A obtains end points of the molten pool 40 based on the image of the molten pool 40 and the machining progress direction. In step S3, the molten pool information calculation unit 5A of the information processing apparatus 2A obtains the center position of the molten pool 40 and the molten pool width using the coordinates of the end points. The information processing apparatus 2A outputs the coordinates of the center position and the value of the molten pool width as the calculation results.

Steps S4 and S5 are operation procedures for the additive manufacturing apparatus 1A in the additive manufacturing system 100A. In step S4, the molten pool width control unit 9 of the additive manufacturing apparatus 1A adjusts the machining parameters using the calculated value of the molten pool width and the target value of the molten pool width. In step S5, the machining point correction unit 8 of the additive manufacturing apparatus 1A corrects the position of the machining point using the calculated coordinates of the center position and the coordinates of the program command position 45. Thus, the additive manufacturing system 100A ends the operation with the procedure illustrated in FIG. 13. When forming an object, the additive manufacturing system 100A always performs the adjustment of the machining parameters and the correction of the position of the machining point by repeatedly performing the operation with the procedure illustrated in FIG. 13.

According to the first embodiment, the image analysis unit 4A acquires an image of the molten pool 40, and obtains, based on the image, end points which are contact points between the contour of the molten pool 40 and a rectangle including two sides along the same direction as the machining progress direction and circumscribing the molten pool 40. As a result, in the information processing apparatus 2A, the molten pool information calculation unit 5A calculates the center position of the molten pool 40 and the width of the molten pool 40 using the position information on the end points. The additive manufacturing apparatus 1A adjusts the machining parameters using the calculation result of the width of the molten pool 40 such that the molten pool 40 having a width matching the target value of the width of the molten pool 40 is formed. The additive manufacturing apparatus 1A corrects the position of the machining point using the calculation result of the center position of the molten pool 40 such that the molten pool 40 having a center position matching the program command position 45 is formed. Thus, the additive manufacturing system 100A can achieve the effect of manufacturing an object with high accuracy in shape.

Second Embodiment

Figure 14:
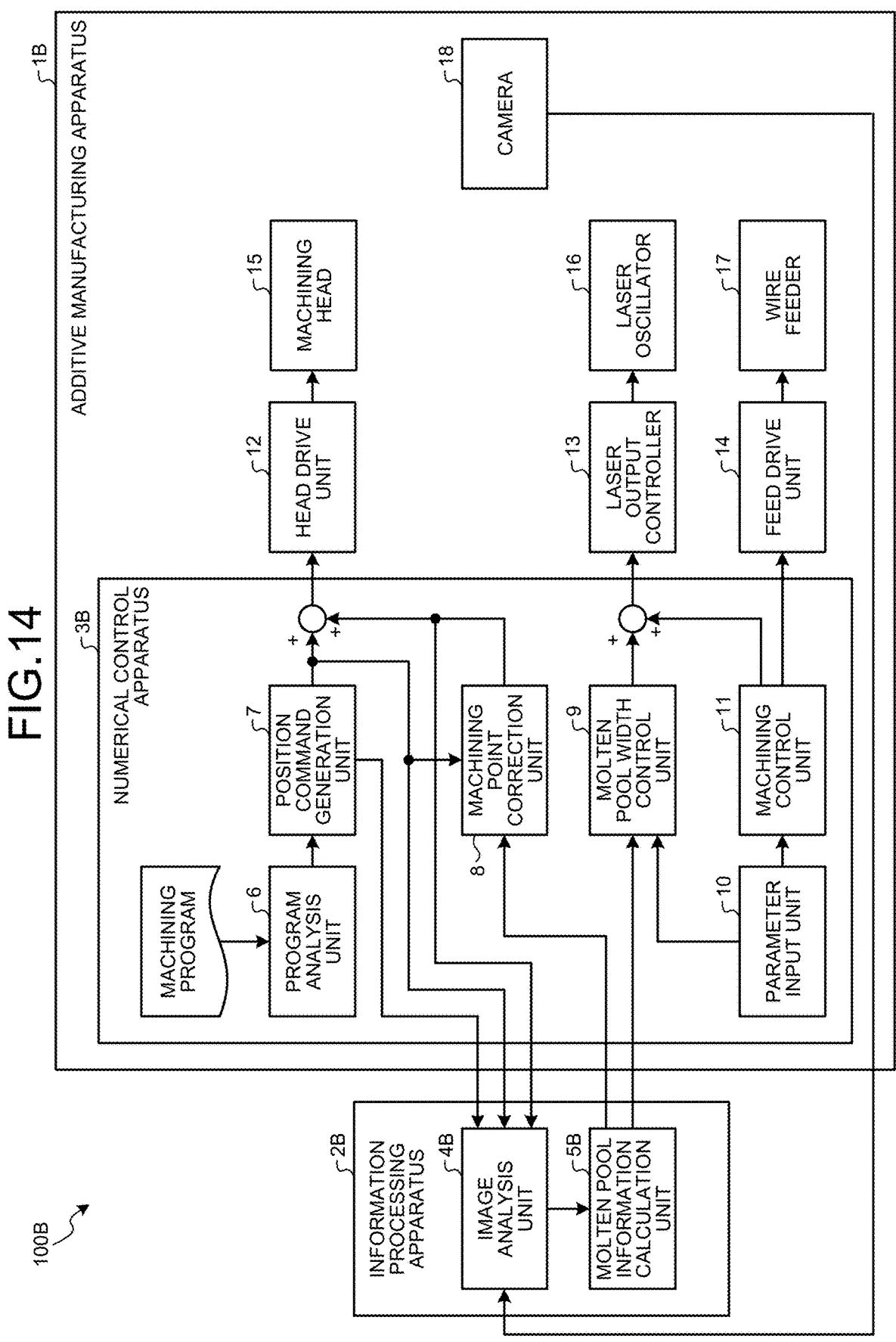
FIG. 14 is a diagram illustrating a configuration of an additive manufacturing system according to a second embodiment.

The second embodiment describes an example of performing processing for reducing error in molten pool information. FIG. 14 is a diagram illustrating a configuration of an additive manufacturing system 100B according to the second embodiment. In the second embodiment, components identical to those in the first embodiment are denoted by the same reference signs, and configuration differences from the first embodiment will be mainly described.

The additive manufacturing system 100B includes an additive manufacturing apparatus 1B and an information processing apparatus 2B capable of communicating with the additive manufacturing apparatus 1B. The additive manufacturing apparatus 1B includes a numerical control apparatus 3B having a configuration different from that of the numerical control apparatus 3A illustrated in FIG. 1. The numerical control apparatus 3B is different from the numerical control apparatus 3A in that the numerical control apparatus 3B outputs information of the correction amount calculated by the machining point correction unit 8 and position commands to the information processing apparatus 2B. The information processing apparatus 2B includes an image analysis unit 4B and a molten pool information calculation unit 5B different from the image analysis unit 4A and the molten pool information calculation unit 5A illustrated in FIG. 1, respectively. Information of the machining progress direction and an image of the molten pool are input to the image analysis unit 4B, as in the case of the image analysis unit 4A. Further, position commands, that is, information on program command positions, are input from the position command generation unit 7 to the image analysis unit 4B. Information of the correction amount is input from the machining point correction unit 8 to the image analysis unit 4B. The image analysis unit 4B outputs position information on end points of the molten pool. The position information on the end points of the molten pool is input to the molten pool information calculation unit 5B. The molten pool information calculation unit 5B outputs the calculation result of the center position of the molten pool and the calculation result of the width of the molten pool.

Figure 15:
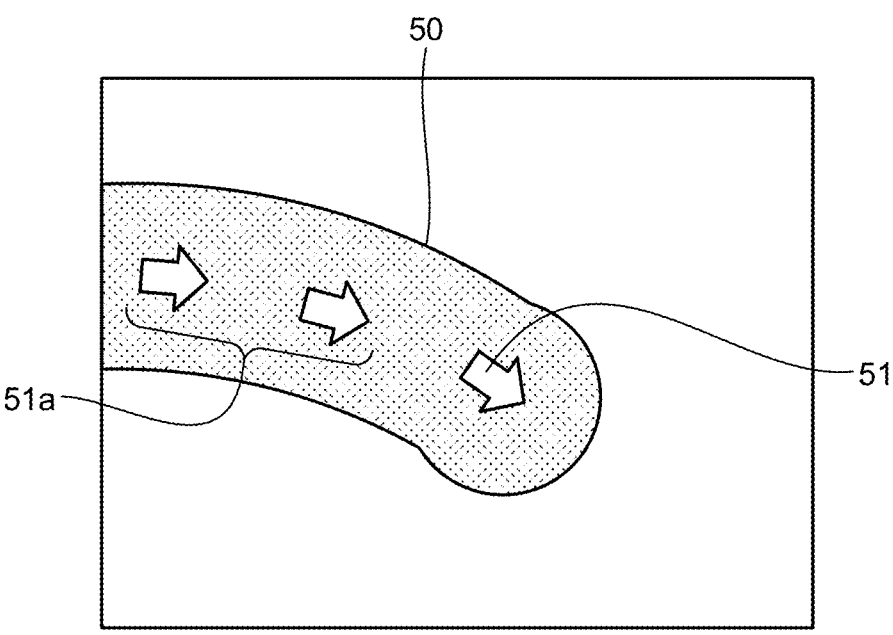
FIG. 15 is a first diagram for explaining error in molten pool information that can be reduced with processing in the second embodiment.
Figure 16:
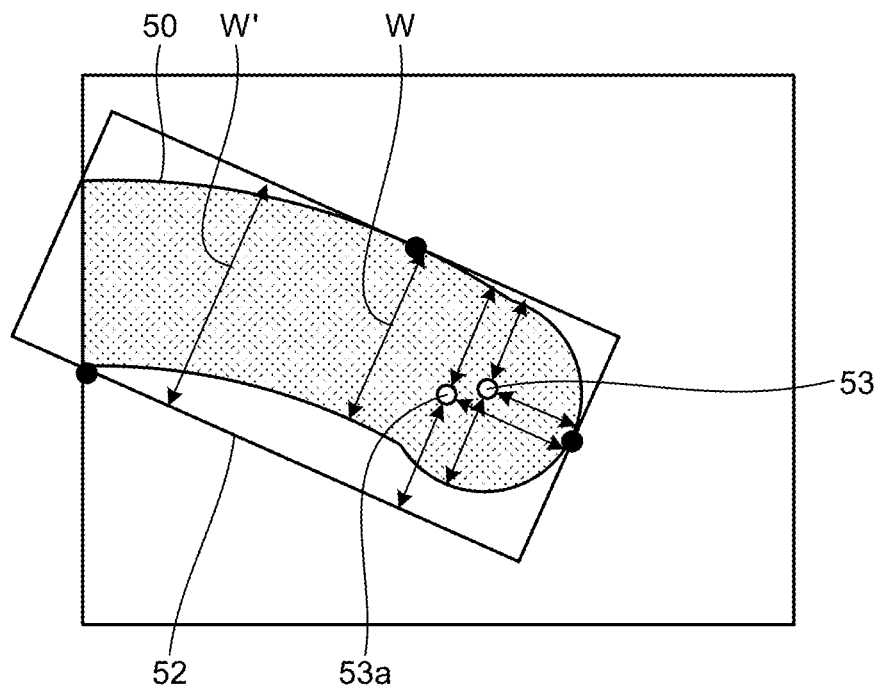
FIG. 16 is a second diagram for explaining error in molten pool information that can be reduced with processing in the second embodiment.

Next, error in molten pool information that can be reduced with processing in the second embodiment will be described. FIG. 15 is a first diagram for explaining error in molten pool information that can be reduced with processing in the second embodiment. FIG. 16 is a second diagram for explaining error in molten pool information that can be reduced with processing in the second embodiment. Here, an error that may occur by calculating the center position of the molten pool and the width of the molten pool with the processing described in the first embodiment will be described.

If the molten state of the molten pool at a past machining point upstream of the current machining point is maintained, the molten pool formed at the current machining point is connected to one or more molten pools formed in the past, in some cases. The molten state of the molten pool is maintained, for example, due to the influence of heat storage in the workpiece, whereby a plurality of molten pools can be connected. A molten pool 50 illustrated in FIG. 15 is an example of a molten pool formed by a plurality of continuous molten pools connected to each other. The molten pool 50 has a shape elongated in the machining progress direction compared with the supposed molten pool at each machining point. It is assumed that the molten pool 50 illustrated in FIG. 15 is formed at a corner where the machining progress direction changes. In FIG. 15, a machining progress direction 51 at the current machining point and machining progress directions 51a at two past machining points are represented by hollow arrows. The machining progress direction 51 and the two machining progress directions 51a are all different directions.

In order to correct the position of the machining point so as to reduce the error between the target shape of the object and the actual shape of the object, it is desired to obtain the center position and the molten pool width for the molten portion at the current machining point in the molten pool 50. In FIG. 16, a center point 53 is the center position of the molten portion at the current machining point. The width W is the width of the molten portion at the current machining point. A center point 53a is the center position obtained with the processing described in the first embodiment. The width W' is the molten pool width obtained with the processing described in the first embodiment. Black circles illustrated in FIG. 16 represent end points obtained with the processing described in the first embodiment. Because the rear portion of the molten pool 50 is curved and extends in the past machining progress directions 51a, the end points obtained based on a rectangle 52 that circumscribes the contour of the molten pool 50 are different from the end points of the molten portion at the current machining point. Therefore, the center point $53a$ displaced from the center point 53 is obtained, and the width W' different from the width W is obtained.

In the second embodiment, the information processing apparatus 2B obtains the end points corresponding to the past to current machining points, thereby reducing error in molten pool information in cases such as that illustrated in FIGS. 15 and 16. That is, the information processing apparatus 2B can obtain the center position and the molten pool width with reduced error.

Figure 17:
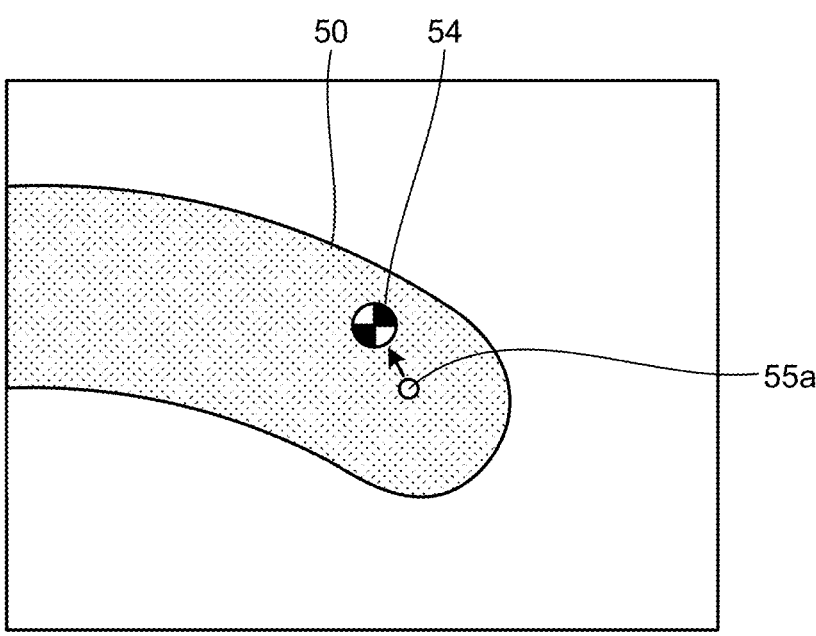
FIG. 17 is a first diagram for explaining processing in the image analysis unit provided in the information processing apparatus of the additive manufacturing system according to the second embodiment.

Next, processing in the information processing apparatus 2B will be described in detail. FIG. 17 is a first diagram for explaining processing in the image analysis unit 4B provided in the information processing apparatus 2B of the additive manufacturing system 100B according to the second embodiment.

The image analysis unit 4B acquires information on the current program command position and information on a past program command position from the position command generation unit 7 of the numerical control apparatus 3B. The current program command position is the program command position at the current machining point indicated by the information input to the image analysis unit 4B. The past program command position is the program command position at a past machining point upstream of the current program command position on the machining path. The image analysis unit 4B also acquires information of the correction amount calculated by the machining point correction unit 8.

The information of the program command positions acquired by the image analysis unit 4B is information that is based on the coordinate system used in the numerical control apparatus 3B. Because the coordinate system used in the numerical control apparatus 3B and the coordinate system for representing positions on the image are different from each other, the image analysis unit 4B associates each program command position with coordinates used in the image. An origin 54 is the origin of coordinates used in the image, that is the coordinate system handled by the image analysis unit 4B. The origin 54 is the position of the axis of the machining head 15, that is, the position of the center line of the laser beam 20.

The position of the origin 54 in the current control cycle is separate from the program command position at the current machining point by the correction amount calculated in the cycle immediately before the current control cycle. The arrow illustrated in FIG. 17 represents the separation corresponding to the correction amount. The image analysis unit 4B subtracts the correction amount calculated in the cycle immediately before the current control cycle from the coordinates of the origin 54 to obtain a current program command position $55a$ on the image.

Figure 18:
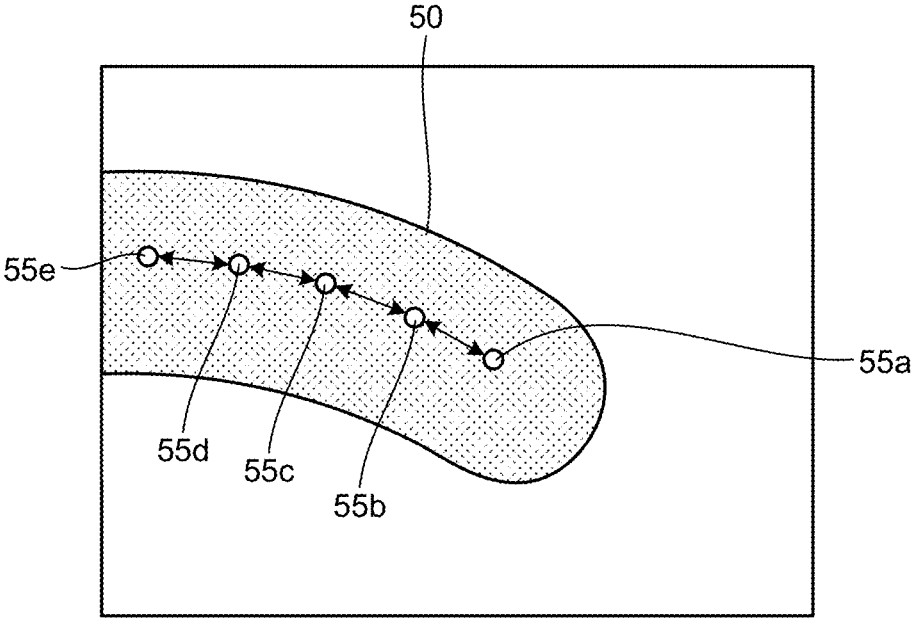
FIG. 18 is a second diagram for explaining processing in the image analysis unit provided in the information processing apparatus of the additive manufacturing system according to the second embodiment.

FIG. 18 is a second diagram for explaining processing in the image analysis unit 4B provided in the information processing apparatus 2B of the additive manufacturing system 100B according to the second embodiment. The image analysis unit 4B obtains past program command positions $55b$, $55c$, $55d$, and $55e$ on the image based on the relative positional relationship between the program command positions. The image analysis unit 4B obtains the relative positional relationship between the program command positions based on the information of each program command position acquired from the numerical control apparatus 3B. Double-headed arrows illustrated in FIG. 18 represent the relative positional relationship between program command positions adjacent to each other.

Figure 19:
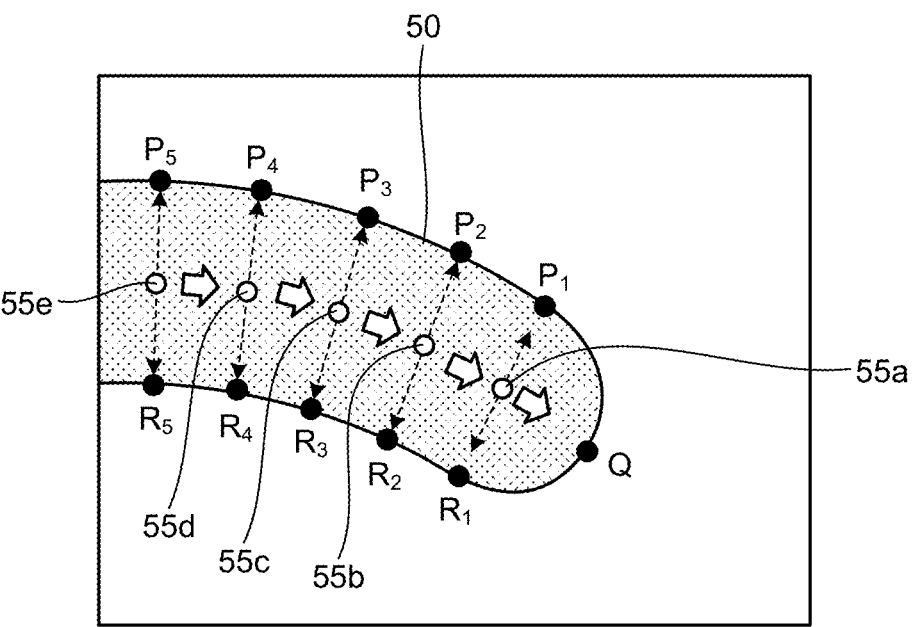
FIG. 19 is a third diagram for explaining processing in the image analysis unit provided in the information processing apparatus of the additive manufacturing system according to the second embodiment.

FIG. 19 is a third diagram for explaining processing in the image analysis unit 4B provided in the information processing apparatus 2B of the additive manufacturing system 100B according to the second embodiment. The image analysis unit 4B obtains the end point Q of the molten pool 50 located at the leading end in the current machining progress direction. The image analysis unit 4B obtains the end point Q through processing similar to that in the first embodiment.

In addition, the image analysis unit 4B obtains end points $P_n$ and $R_n$ corresponding to the program command positions $55a$, $55b$, $55c$, $55d$, and $55e$. In the example shown here, reference character "n" is an integer of one to five. Each of the end point $P_1$ and the end point $R_1$ is an end point corresponding to the program command position $55a$. Each of the end point $P_1$ and the end point $R_1$ is an intersection of the contour of the molten pool 50 and a perpendicular which is a line perpendicular to the current machining progress direction and passes through the program command position $55a$. In FIG. 19, the double-headed arrow passing through the program command position $55a$ represents the perpendicular.

Each of the end point $P_2$ and the end point $R_2$ is an end point corresponding to the program command position $55b$. Each of the end point $P_2$ and the end point $R_2$ is an intersection of the contour of the molten pool 50 and a perpendicular which is a line perpendicular to the machining progress direction at the program command position $55b$ and passes through the program command position $55b$. The image analysis unit 4B regards the direction of the program command position $55a$ viewed from the program command position $55b$ as the machining progress direction at the program command position $55b$, and obtains each of the end point $P_2$ and the end point $R_2$.

Each of the end point $P_3$ and the end point $R_3$ is an end point corresponding to the program command position $55c$. Each of the end point $P_4$ and the end point $R_4$ is an end point corresponding to the program command position $55d$. Each of the end point $P_5$ and the end point $R_5$ is an end point corresponding to the program command position $55e$. The image analysis unit 4B obtains the end points $P_3$ and $R_3$, the end points $P_4$ and $R_4$, and the end points $P_5$ and $R_5$ in the same manner as it obtains the end points $P_2$ and $R_2$.

In this manner, the image analysis unit 4B obtains the end points corresponding to each of a plurality of program command positions including the current program command position and a past program command position using information about each of the plurality of program command positions and information of the progress direction at each of the plurality of program command positions. The image analysis unit 4B outputs the obtained coordinates of the end points to the molten pool information calculation unit 5B. Although the image analysis unit 4B in the above description obtains the end points $P_n$ and $R_n$ at each of the five program command positions $55a$, $55b$, $55c$, $55d$, and $55e$, the number of program command positions is not limited to five. The image analysis unit 4B only needs to obtain the end points $P_n$ and $R_n$ for a plurality of program command positions including the current program command position.

Next, calculation of the molten pool width by the molten pool information calculation unit 5B will be described. The molten pool information calculation unit 5B calculates the molten pool width using information of the end points corresponding to one or more program command positions among a plurality of program command positions. Here, first to third examples of calculating the molten pool width will be described.

Figure 20:
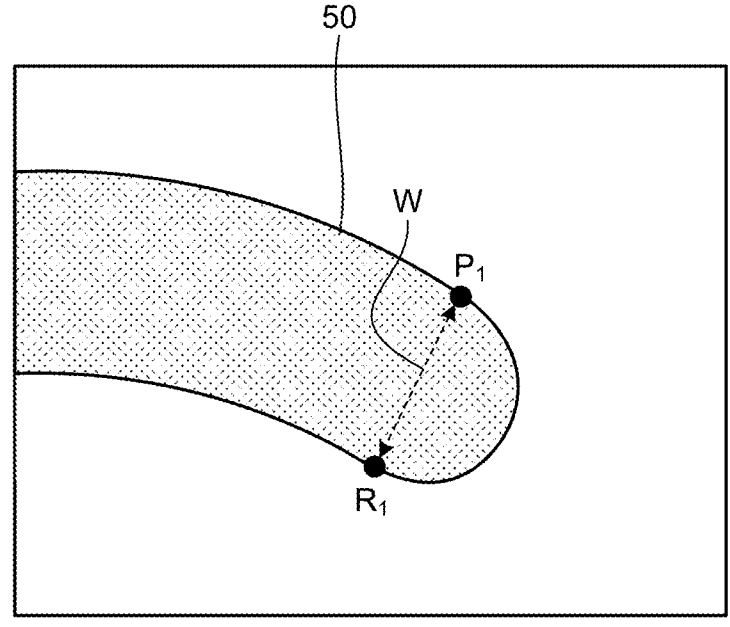
FIG. 20 is a diagram for explaining a first example in which the molten pool width is calculated by the molten pool information calculation unit provided in the information processing apparatus of the additive manufacturing system according to the second embodiment.

FIG. 20 is a diagram for explaining a first example in which the molten pool width is calculated by the molten pool information calculation unit 5B provided in the information processing apparatus 2B of the additive manufacturing system 100B according to the second embodiment. In the first example, the molten pool information calculation unit 5B calculates the width W of the molten pool using the coordinates of the end points $P_1$ and $R_1$ corresponding to the program command position 55$a$. The width W is the distance between the end point $P_1$ and the end point $R_1$. The first example is an example in which the molten pool width is calculated with the simplest method among the three examples.

Figure 21:
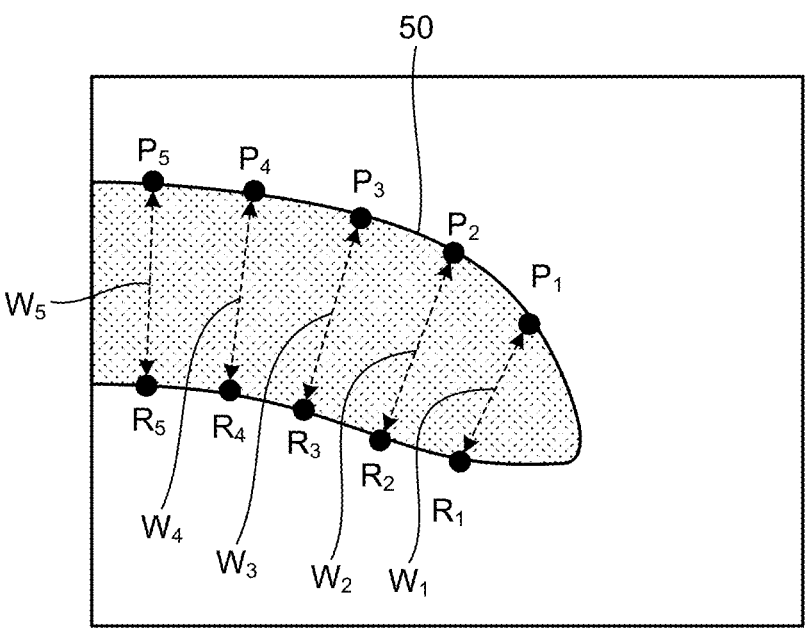
FIG. 21 is a diagram for explaining a second example in which the molten pool width is calculated by the molten pool information calculation unit provided in the information processing apparatus of the additive manufacturing system according to the second embodiment.
Figure 22:
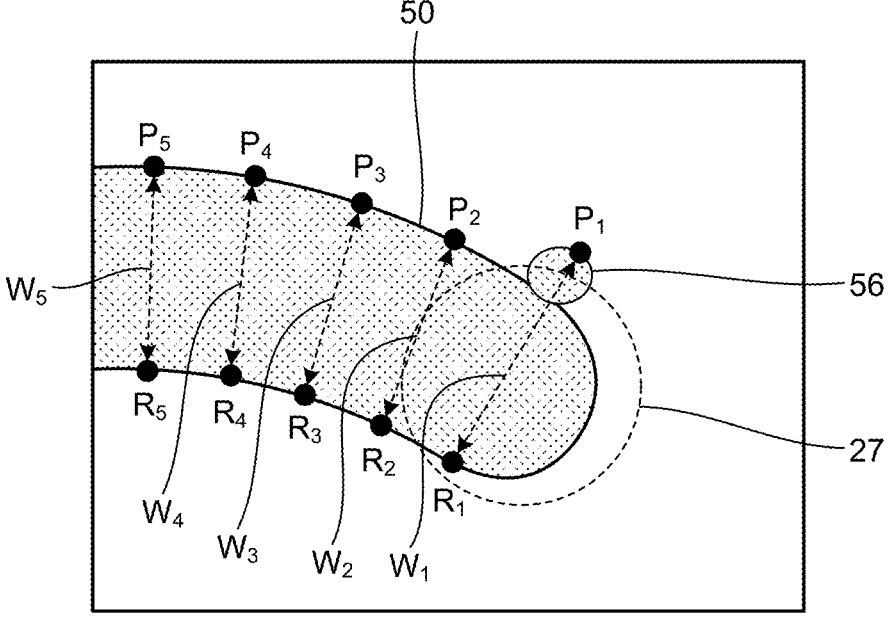
FIG. 22 is a diagram for explaining the second example in which the molten pool width is calculated by the molten pool information calculation unit provided in the information processing apparatus of the additive manufacturing system according to the second embodiment.

FIGS. 21 and 22 are diagrams for explaining a second example in which the molten pool width is calculated by the molten pool information calculation unit 5B provided in the information processing apparatus 2B of the additive manufacturing system 100B according to the second embodiment. At the leading end portion of the molten pool 50 in the current machining progress direction, the accumulation of heat may be small and the molten pool width may be narrow compared with a portion that is behind the leading end portion and is in a steady molten state. FIG. 21 illustrates the molten pool width of the leading end portion that is narrower than the molten pool width of the portion behind the leading end portion.

When the molten pool 50 is formed on a bead, a part of the laser beam 20 may deviate from the bead and fall on the base material 22, and reflected light from the base material 22 may be captured in the image and erroneously recognized as a part of the molten pool 50. FIG. 22 illustrates reflected light 56 captured as noise in the image together with the spot 27 of the laser beam 20. Because the reflected light 56 is detected near the current machining point, the reflected light 56 may cause an error in the calculation result of the molten pool width at the leading end portion.

In the second example, the molten pool information calculation unit 5B calculates the molten pool width using information of the end points corresponding to a program command position at a position farther than a preset distance from the center of the spot 27 on the workpiece among a plurality of program command positions. By setting an appropriate distance as the distance from the center of the spot 27, the molten pool information calculation unit 5B calculates the molten pool width using information of the end points corresponding to any one of the four program command positions 55$b$, 55$c$, 55$d$, and 55$e$, not the program command position 55$a$. That is, the molten pool information calculation unit 5B excludes the width $W_1$ between the end points $P_1$ and $R_1$, and calculates, as the molten pool width, one of the width $W_2$ between the end points $P_2$ and $R_2$, the width $W_3$ between the end points $P_3$ and $R_3$, the width $W_4$ between the end points $P_4$ and $R_4$, and the width $W_5$ between the end points $P_5$ and $R_5$.

According to the second example, the molten pool information calculation unit 5B calculates the molten pool width while avoiding the leading end portion of the molten pool 50 and the vicinity of the center of the spot 27 by excluding the end points corresponding to the program command position 55$a$. As a result, the molten pool information calculation unit 5B can reduce the error of the calculated molten pool width.

Figure 23:
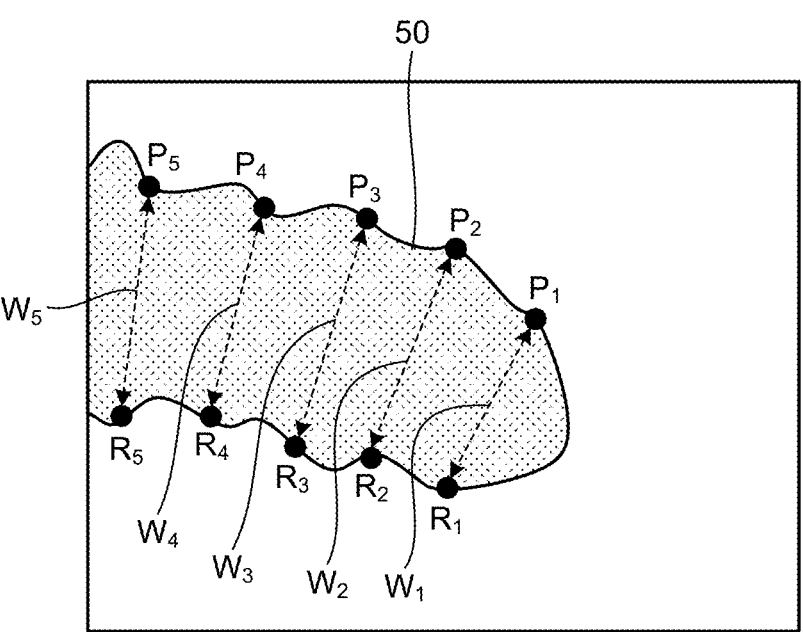
FIG. 23 is a diagram for explaining a third example in which the molten pool width is calculated by the molten pool information calculation unit provided in the information processing apparatus of the additive manufacturing system according to the second embodiment.

FIG. 23 is a diagram for explaining a third example in which the molten pool width is calculated by the molten pool information calculation unit 5B provided in the information processing apparatus 2B of the additive manufacturing system 100B according to the second embodiment. In the third example, the molten pool information calculation unit 5B obtains two or more values of the width of the molten pool 50 using information on the end points corresponding to two or more program command positions among a plurality of program command positions, and calculates the average of the two or more values.

A plurality of physical phenomena may affect the molten pool 50 to make the shape of the molten pool 50 unstable. FIG. 23 illustrates a state in which the shape of the molten pool 50 is unstable. The unstable shape of the molten pool 50 may cause an error in the calculation result of the molten pool width. The error in the calculation result of the molten pool width is a noise component for the control of the additive manufacturing system 100B.

In the third example, the molten pool information calculation unit 5B averages the molten pool widths obtained using information on the end points corresponding to two or more program command positions, thereby smoothing errors in molten pool width at different positions of the molten pool 50. The molten pool information calculation unit 5B calculates the molten pool width by averaging any two or more of the widths $W_n$ calculated based on the end points $P_n$ and $R_n$ at the five program command positions 55$a$, 55$b$, 55$c$, 55$d$, and 55$e$. In consideration of the influence of error at the leading end portion, the molten pool width calculated may be a value obtained by excluding the width $W_1$, such as the average of the widths $W_2$, $W_3$, $W_4$, and $W_5$ or the average of the widths $W_3$, $W_4$, and $W_5$.

According to the third example, the molten pool information calculation unit 5B obtains two or more values of the width of the molten pool 50 using information on the end points corresponding to two or more program command positions, and calculates the average of the two or more values, thereby reducing the error of the calculated molten pool width.

Figure 24:
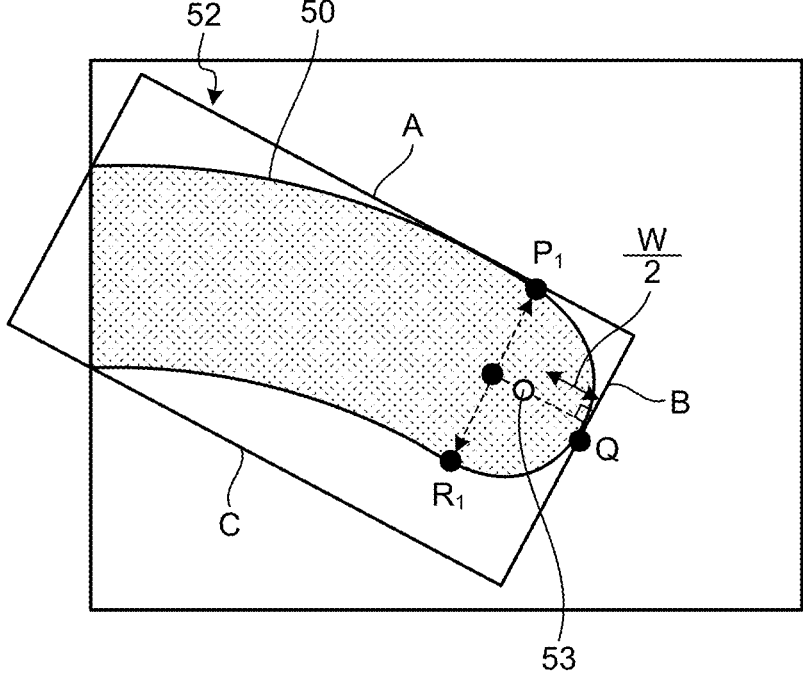
FIG. 24 is a diagram for explaining an example in which the center position of the molten pool is calculated by the molten pool information calculation unit provided in the information processing apparatus of the additive manufacturing system according to the second embodiment.
Figure 25:
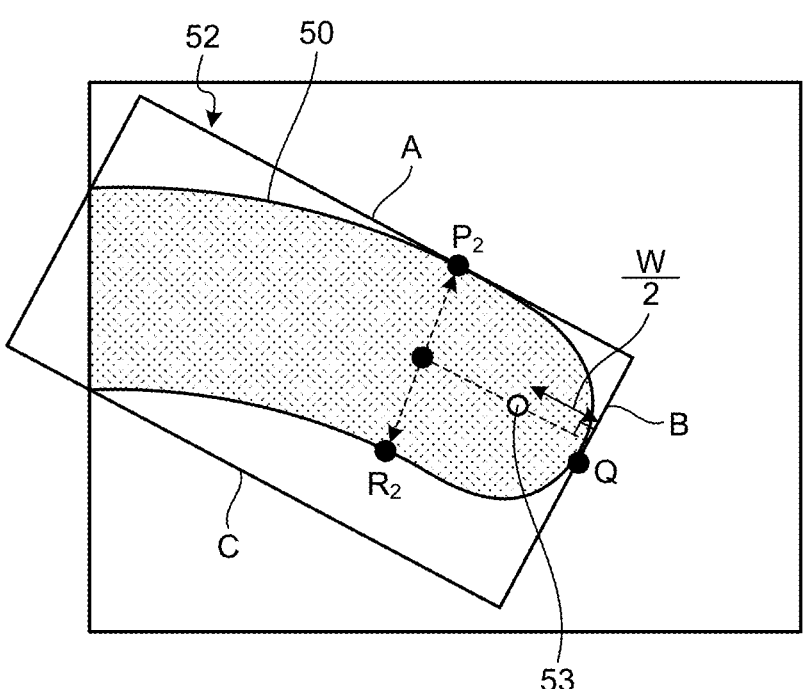
FIG. 25 is a diagram for explaining an example in which the center position of the molten pool is calculated by the molten pool information calculation unit provided in the information processing apparatus of the additive manufacturing system according to the second embodiment.

Next, calculation of the center position in the molten pool information calculation unit 5B will be described. FIGS. 24 and 25 are diagrams for explaining an example in which the center position of the molten pool is calculated by the molten pool information calculation unit 5B provided in the information processing apparatus 2B of the additive manufacturing system 100B according to the second embodiment. The molten pool information calculation unit 5B calculates the center position using information on the end points corresponding to any one of a plurality of program command positions.

The center point 53 illustrated in FIG. 24 is the center position calculated using information on the end points $P_1$ and $R_1$ corresponding to the program command position 55$a$. The center point 53 is a point on a perpendicular which is a line perpendicular to side B and passes through the midpoint between the end point $P_1$ and the end point $R_1$. The center point 53 is at a distance of W/2 from side B on the perpendicular.

The center point 53 illustrated in FIG. 25 is the center position calculated using information on the end points $P_2$ and $R_2$ corresponding to the program command position 55$b$. The center point 53 is a point on a perpendicular which is a line perpendicular to side B and passes through the midpoint between the end point $P_2$ and the end point $R_2$. The center point 53 is at a distance of W/2 from side B on the perpendicular.

The molten pool information calculation unit 5B may calculate the center position based on the end points corresponding to a program command position different from the program command positions 55$a$ and 55$b$. The molten pool information calculation unit 5B may calculate the center position based on end points different from the end points $P_1$ and $R_1$ in consideration of the influence of error at the leading end portion described above.

According to the second embodiment, the image analysis unit 4B can obtain accurate end points by obtaining end points using information on each of a plurality of program command positions and information on the progress direction at each of the plurality of program command positions. The molten pool information calculation unit 5B can calculate the accurate center position of the molten pool 50 and the accurate width of the molten pool 50 using information of the end points corresponding to one or more program command positions among the plurality of program command positions. Thus, the additive manufacturing system 100B can achieve the effect of manufacturing an object with high accuracy in shape.

Third Embodiment

Figure 26:
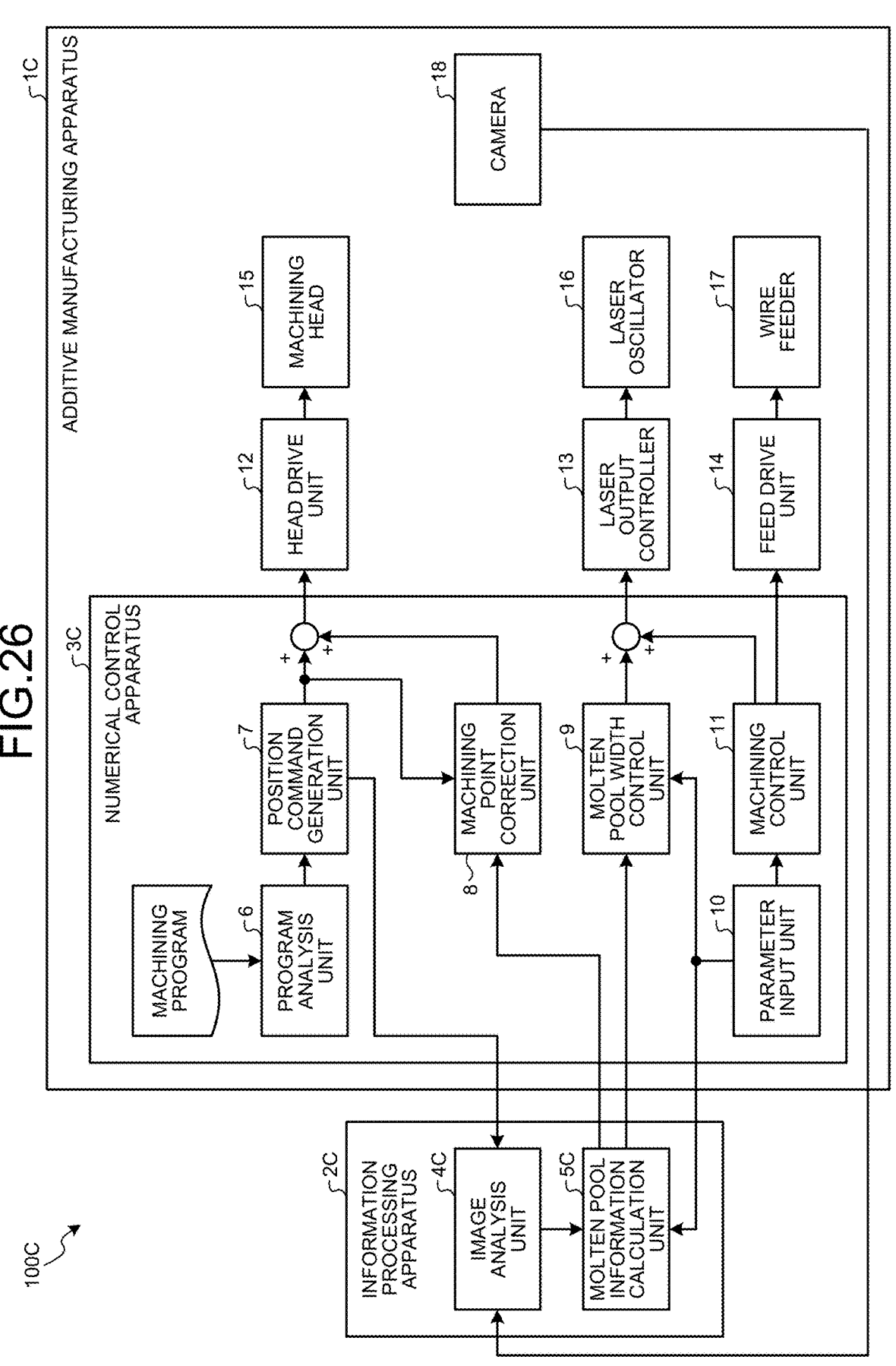
FIG. 26 is a diagram illustrating a configuration of an additive manufacturing system according to a third embodiment.

The third embodiment describes an example that enables calculation of an end portion at the corner of a machining path in which the end portion may be erroneously calculated with the processing of the first or second embodiment. FIG. 26 is a diagram illustrating a configuration of an additive manufacturing system 100C according to the third embodiment. In the third embodiment, components identical to those in the first or second embodiment are denoted by the same reference signs, and configuration differences from the first or second embodiment will be mainly described.

The additive manufacturing system 100C includes an additive manufacturing apparatus 1C and an information processing apparatus 2C capable of communicating with the additive manufacturing apparatus 1C. The additive manufacturing apparatus 1C includes a numerical control apparatus 3C having a configuration different from that of the numerical control apparatus 3A illustrated in FIG. 1. The numerical control apparatus 3C is different from the numerical control apparatus 3A in that the numerical control apparatus 3C outputs, to the information processing apparatus 2C, the target value of the width of the molten pool input to the parameter input unit 10. The information processing apparatus 2C includes an image analysis unit 4C and a molten pool information calculation unit 5C different from the image analysis unit 4A and the molten pool information calculation unit 5A illustrated in FIG. 1. Information on the machining progress direction and an image of the molten pool are input to the image analysis unit 4C, as in the case of the image analysis unit 4A. The image analysis unit 4C outputs position information on end points of the molten pool. The position information on the end points of the molten pool is input to the molten pool information calculation unit 5C. Further, the target value of the width of the molten pool is input to the molten pool information calculation unit 5C from the parameter input unit 10. The molten pool information calculation unit 5C outputs the calculation result of the center position of the molten pool and the calculation result of the width of the molten pool.

Figure 27:
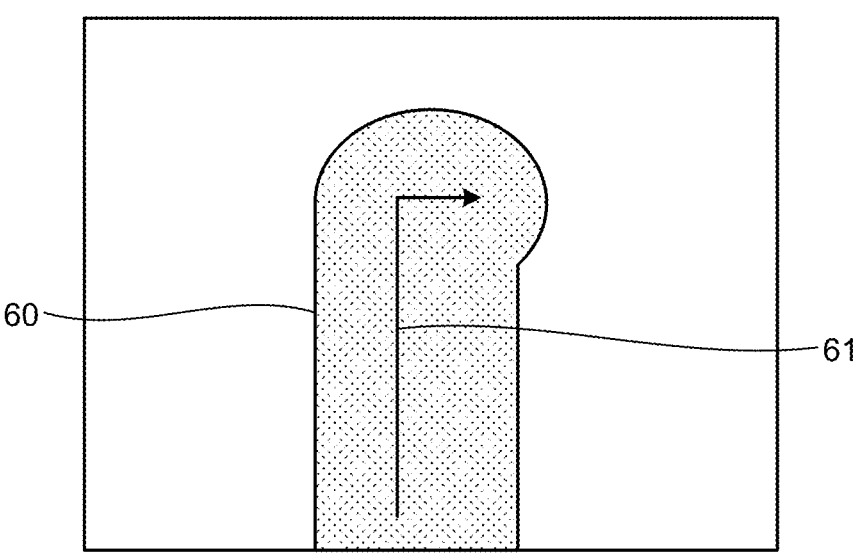
FIG. 27 is a first diagram for explaining error in the calculation of an end portion that can be avoided with processing in the third embodiment.
Figure 28:
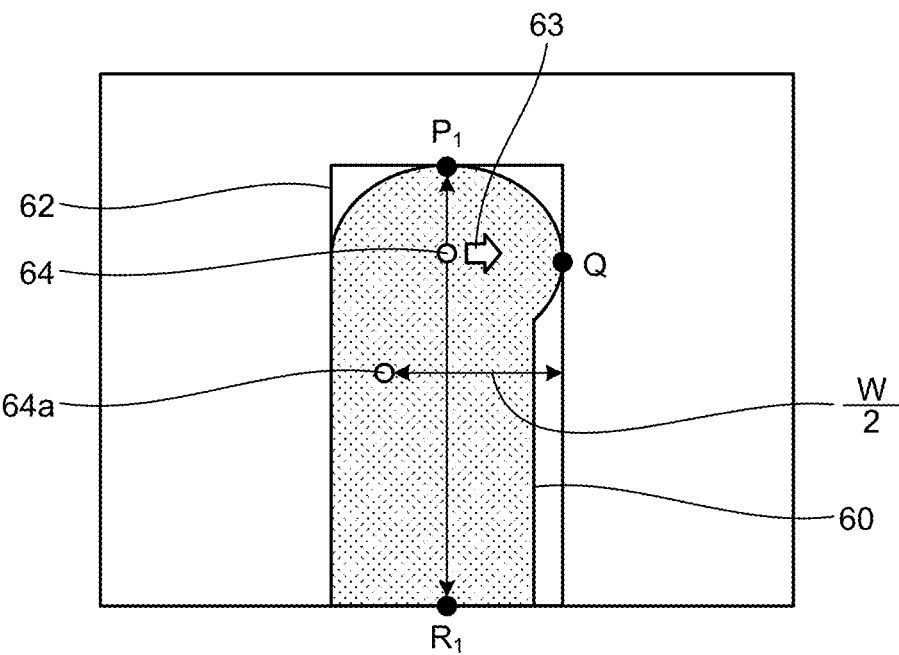
FIG. 28 is a second diagram for explaining error in the calculation of an end portion that can be avoided with processing in the third embodiment.

Next, error in the calculation of an end portion that can be avoided with processing in the third embodiment will be described. FIG. 27 is a first diagram for explaining error in the calculation of an end portion that can be avoided with processing in the third embodiment. FIG. 28 is a second diagram for explaining error in the calculation of an end portion that can be avoided with processing in the third embodiment. Here, an error that may occur by calculating the end portion of the molten pool with the processing described in the first embodiment will be described.

A molten pool 60 illustrated in FIG. 27 is an example of a molten pool formed by a plurality of continuous molten pools connected to each other. FIG. 27 illustrates the molten pool 60 immediately after the passing of the machining point through the corner of a machining path 61. The machining path 61 is bent at a right angle at the corner.

Here, in the molten pool 60, a first end point is defined as an end point of the molten portion at the machining point immediately after the passing of the machining point through the corner, and located outside the bend at the corner. In the molten pool 60, a second end point is defined as an end point of the molten portion at the machining point immediately after the passing of the machining point through the corner, and located inside the bend at the corner. The first end point is a point on the contour of the molten pool 60, and thus is obtained with the processing described in the first embodiment. On the other hand, the second end point is buried in the portion of the molten pool 60 formed before the passing of the machining point through the corner, and thus cannot be obtained with the processing described in the first embodiment.

In FIG. 28, a machining progress direction 63 at the current machining point is represented by a hollow arrow. A center point 64 is the center position of the molten portion at the current machining point immediately after passing through the corner. The end point $P_1$ illustrated in FIG. 28 is the first end point of the molten portion at the current machining point. The end point $R_1$ illustrated in FIG. 28 is not the second end point of the molten portion at the current machining point, but the second end point erroneously obtained with the processing described in the first embodiment. The end point $R_1$ is obtained based on a rectangle 62 circumscribing the contour of the molten pool 60. In the example illustrated in FIG. 28, a center point 64a displaced from the center point 64 is obtained with the processing described in the first embodiment, and a wrong molten pool width is obtained.

In the third embodiment, the information processing apparatus 2C estimates the position of the second end point using information on the first end point for a corner bent at a curvature larger than a preset threshold on the machining path. As a result, the information processing apparatus 2C can avoid an error in the calculation of the second end point, and can calculate the accurate second end point.

Figure 29:
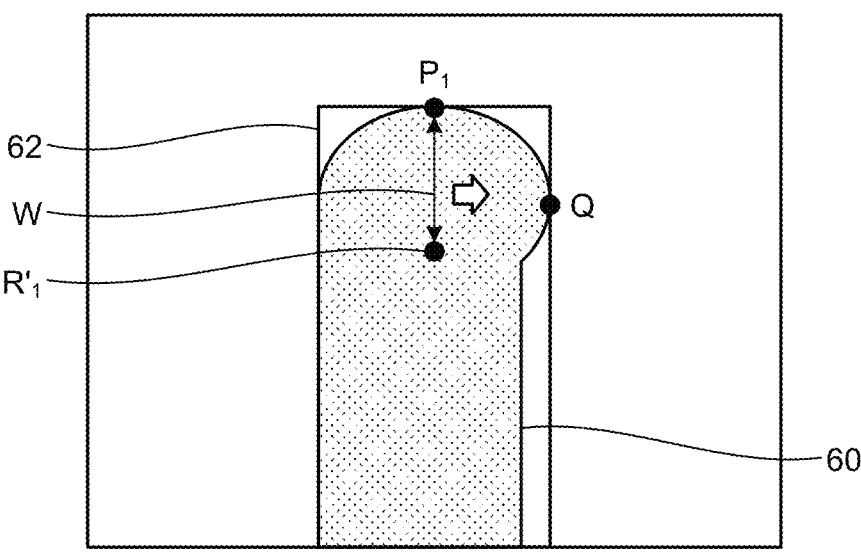
FIG. 29 is a diagram for explaining processing in the image analysis unit and the molten pool information calculation unit of the additive manufacturing system according to the third embodiment.

Next, processing in the information processing apparatus 2C will be described in detail. FIG. 29 is a diagram for explaining processing in the image analysis unit 4C and the molten pool information calculation unit 5C of the additive manufacturing system 100C according to the third embodiment.

The image analysis unit 4C obtains the end point Q of the molten pool 60 located at the leading end in the current machining progress direction. In addition, the image analysis unit 4C obtains, for the corner bent at a curvature larger than a preset threshold on the machining path, the end point $P_1$ which is the first end point located outside the bend at the corner. The image analysis unit 4C obtains the end point Q and the end point $P_1$ based on the rectangle 62 through processing similar to that in the first embodiment. The image analysis unit 4C outputs the coordinates of the end point $P_1$.

The molten pool information calculation unit 5C estimates the position of an end point $R'_1$ using information of the machining progress direction, the coordinates of the end point $P_1$, and the target value of the width W. The end point $R'_1$ is the second end point located inside the bend at the corner. The molten pool information calculation unit 5C acquires information on the machining progress direction from the image analysis unit 4C. The molten pool information calculation unit 5C may acquire information on the machining progress direction from the position command generation unit 7. The end point $R'_1$ is a point located ahead of the end point $P_1$ toward the inside of the molten pool 60 in the direction perpendicular to the machining progress direction, and is at a distance of the target value of the width W from the end point $P_1$. The molten pool information calculation unit 5C obtains the center position and the molten pool width through processing similar to that in the first embodiment using the coordinates of the end points $P_1$ and $R'_1$.

In this manner, the molten pool information calculation unit 5C acquires the target value of the width W of the molten pool 60, and estimates, as the position of the second end point, the position separated from the first end point by the distance corresponding to the target value of the width W in the direction perpendicular to the machining progress direction. The molten pool information calculation unit 5C estimates the position of the second end point using information on the first end point, and calculates the center position and the molten pool width of the molten pool 60 using the information on the first end point and information on the second end point.

According to the third embodiment, the molten pool information calculation unit 5C can obtain the accurate second end point by estimating the position of the second end point using information on the first end point for the corner bent at a curvature larger than the threshold on the machining path. The molten pool information calculation unit 5C can calculate the accurate center position of the molten pool 60 and the accurate width of the molten pool 60 using the information on the first end point and information on the second end point. Thus, the additive manufacturing system 100C can achieve the effect of manufacturing an object with high accuracy in shape. Note that the additive manufacturing system 100C may have both the functions described in the first embodiment and the functions described in the third embodiment, or may have both the functions described in the second embodiment and the functions described in the third embodiment.

Fourth Embodiment

Figure 30:
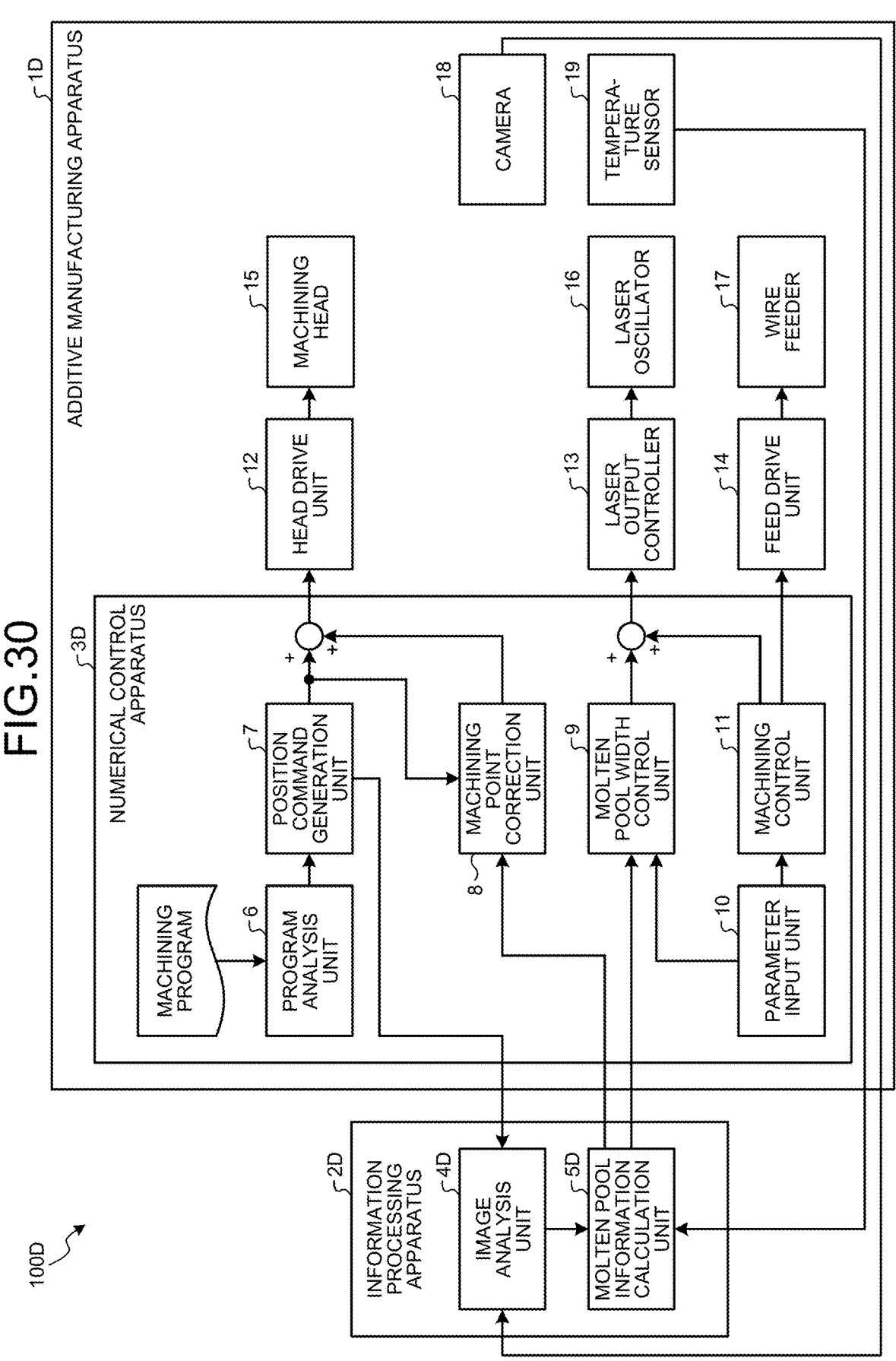
FIG. 30 is a diagram illustrating a configuration of an additive manufacturing system according to a fourth embodiment.

The fourth embodiment describes an example in which an estimated value of the width of the molten pool 60 is obtained based on the temperature of the molten pool 60, and the position of the second end point is estimated using the estimated value of the width of the molten pool 60. FIG. 30 is a diagram illustrating a configuration of an additive manufacturing system 100D according to the fourth embodiment. In the fourth embodiment, components identical to those in the first to third embodiments are denoted by the same reference signs, and configuration differences from the first to third embodiments will be mainly described.

The additive manufacturing system 100D includes an additive manufacturing apparatus 1D and an information processing apparatus 2D capable of communicating with the additive manufacturing apparatus 1D. The additive manufacturing apparatus 1D is different from the additive manufacturing apparatus 1A illustrated in FIG. 1 in that the additive manufacturing apparatus 1D includes a temperature sensor 19 that measures the temperature of the molten pool 60. The additive manufacturing apparatus 1D includes a numerical control apparatus 3D similar to the numerical control apparatus 3A illustrated in FIG. 1. The information processing apparatus 2D includes an image analysis unit 4D different from the image analysis unit 4A illustrated in FIG. 1 and a molten pool information calculation unit 5D different from the molten pool information calculation unit 5A illustrated in FIG. 1. Information on the machining progress direction and an image of the molten pool are input to the image analysis unit 4D, as in the case of the image analysis unit 4A. The image analysis unit 4D outputs position information on end points of the molten pool. The position information on the end points of the molten pool is input to the molten pool information calculation unit 5D. Further, information on the temperature of the molten pool is input to the molten pool information calculation unit 5D from the temperature sensor 19. The molten pool information calculation unit 5D outputs the calculation result of the center position of the molten pool and the calculation result of the width of the molten pool.

The temperature sensor 19 is a radiation thermometer, a thermo camera, or the like. The temperature sensor 19 may be included in the sensor unit described in the first embodiment.

The image analysis unit 4D obtains, for the corner bent at a curvature larger than a preset threshold on the machining path, the end point $P_1$ which is the first end point located outside the bend at the corner. The image analysis unit 4D obtains the end point $P_1$ through processing similar to that in the first embodiment. The image analysis unit 4D outputs the coordinates of the end point $P_1$.

Figure 31:
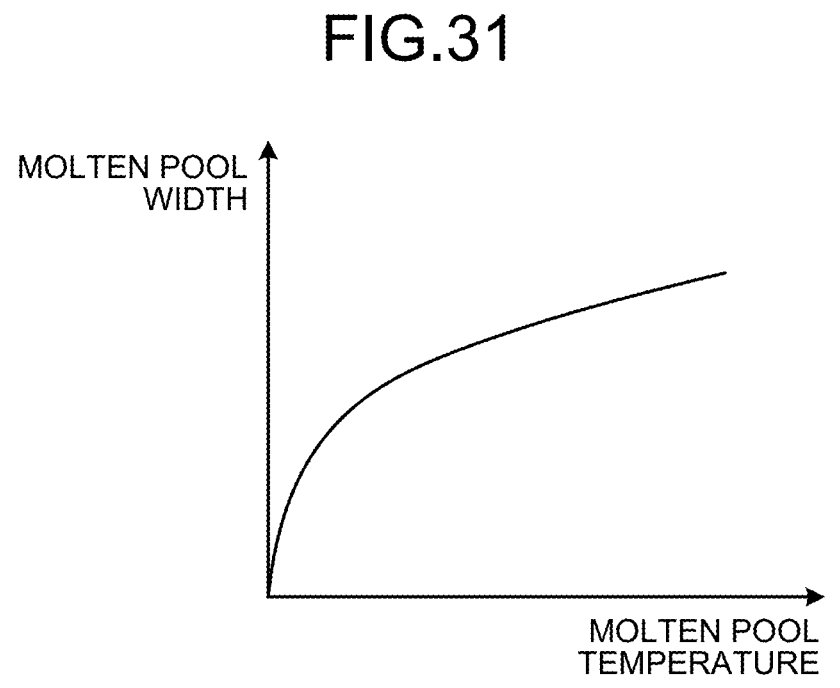

FIG. 31 is a diagram for explaining processing in the molten pool information calculation unit 5D provided in the information processing apparatus 2D of the additive manufacturing system 100D according to the fourth embodiment. FIG. 31 is a graph representing the relationship between the temperature of the molten pool 60 and the width of the molten pool 60. The vertical axis of the graph represents the molten pool width, and the horizontal axis represents the molten pool temperature. The molten pool information calculation unit 5D holds in advance a model indicating the relationship illustrated in FIG. 31. The model is created based on data obtained by experiments or data obtained using a physical model. Any method may be used to create the model. The temperature measurement result from the temperature sensor 19 is input to the molten pool information calculation unit 5D. The molten pool information calculation unit 5D obtains an estimated value of the width W using the temperature measurement result and the model.

The molten pool information calculation unit 5D estimates the position of the end point $R'_1$ using information of the machining progress direction, the coordinates of the end point $P_1$, and the estimated value of the width W. The end point $R'_1$ is the second end point located inside the bend at the corner. The molten pool information calculation unit 5D acquires information on the machining progress direction from the image analysis unit 4D. The molten pool information calculation unit 5D may acquire information of the machining progress direction from the position command generation unit 7. The end point $R'_1$ is a point located ahead of the end point $P_1$ toward the inside of the molten pool 60 in the direction perpendicular to the machining progress direction, and is at a distance of the estimated value of the width W from the end point $P_1$. The molten pool information calculation unit 5D obtains the center position through processing similar to that in the first embodiment using the coordinates of the end points $P_1$ and $R'_1$.

In this manner, the molten pool information calculation unit 5D acquires information on the temperature of the molten pool 60, obtains an estimated value of the width W of the molten pool 60 based on the temperature of the molten pool 60, and obtains the center position based on the position of the first end point and the estimated value of the width W.

According to the fourth embodiment, the molten pool information calculation unit 5D can calculate the accurate center position of the molten pool 60 for the corner bent at a curvature larger than the threshold on the machining path. Thus, the additive manufacturing system 100D can achieve the effect of manufacturing an object with high accuracy in shape. Note that the additive manufacturing system 100D may have both the functions described in the first embodiment and the functions described in the fourth embodiment, or may have both the functions described in the second embodiment and the functions described in the fourth embodiment.

Next, hardware for implementing the numerical control apparatuses 3A, 3B, 3C, and 3D according to the first to fourth embodiments will be described. The numerical control apparatuses 3A, 3B, 3C, and 3D can be implemented by hardware having the configuration illustrated in FIG. 32 or 33.

Figure 32:
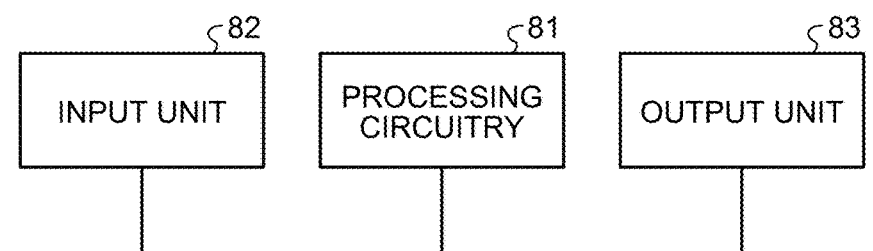
FIG. 32 is a diagram illustrating a first exemplary configuration of hardware for implementing the numerical control apparatuses of the additive manufacturing systems according to the first to fourth embodiments.

FIG. 32 is a diagram illustrating a first exemplary configuration of hardware for implementing the numerical control apparatuses 3A, 3B, 3C, and 3D of the respective additive manufacturing systems 100A, 100B, 100C, and 100D according to the first to fourth embodiments. FIG. 32 illustrates the configuration in which each of the main units of the numerical control apparatuses 3A, 3B, 3C, and 3D, namely the program analysis unit 6, the position command generation unit 7, the machining point correction unit 8, the molten pool width control unit 9, and the machining control unit 11, is implemented by processing circuitry 81 which is dedicated hardware.

The processing circuitry 81 is, for example, an application specific integrated circuit (ASIC), a field-programmable gate array (FPGA), or a circuit that is a combination thereof. In the example illustrated in FIG. 32, each main unit of the numerical control apparatuses 3A, 3B, 3C, and 3D is implemented by the single piece of processing circuitry 81, but the present disclosure is not limited thereto. The hardware may include a plurality of pieces of processing circuitry 81, and each main unit of the numerical control apparatuses 3A, 3B, 3C, and 3D may be implemented by different pieces of processing circuitry 81. An input unit 82 is a circuit that receives input signals to the numerical control apparatuses 3A, 3B, 3C, and 3D from the outside. The function of the parameter input unit 10 is implemented by the input unit 82. An output unit 83 is a circuit that outputs signals generated by the numerical control apparatuses 3A, 3B, 3C, and 3D to the outside.

Figure 33:
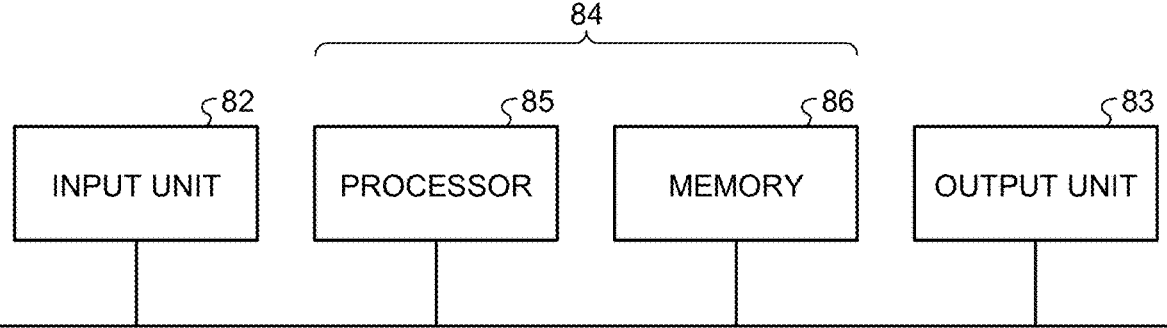
FIG. 33 is a diagram illustrating a second exemplary configuration of hardware for implementing the numerical control apparatuses of the additive manufacturing systems according to the first to fourth embodiments.

FIG. 33 is a diagram illustrating a second exemplary configuration of hardware for implementing the numerical control apparatuses 3A, 3B, 3C, and 3D of the additive manufacturing systems 100A, 100B, 100C, and 100D according to the first to fourth embodiments. FIG. 33 illustrates the configuration in which the function of each main unit of the numerical control apparatuses 3A, 3B, 3C, and 3D is implemented by processing circuitry 84 including a processor 85 and a memory 86. The processor 85 is a central processing unit (CPU). The processor 85 may be a computing device, a microprocessor, a microcomputer, or a digital signal processor (DSP). The memory 86 is, for example, a volatile or non-volatile memory such as a random access memory (RAM), a read only memory (ROM), a flash memory, an erasable programmable read only memory (EPROM), or an electrically erasable programmable read only memory (EEPROM, registered trademark).

When each main unit of the numerical control apparatuses 3A, 3B, 3C, and 3D is implemented by the processor 85 and the memory 86, the processor 85 executes a numerical control program that is a program describing processing for operating as each main unit of the numerical control apparatuses 3A, 3B, 3C, and 3D. The numerical control program is stored in the memory 86 in advance. The processor 85 reads and executes the numerical control program stored in the memory 86 to operate as each main unit of the numerical control apparatuses 3A, 3B, 3C, and 3D. Note that a part of each main unit of the numerical control apparatuses 3A, 3B, 3C, and 3D may be implemented by the processor 85 and the memory 86, and the rest may be implemented by dedicated hardware similar to the processing circuitry 81 illustrated in FIG. 32.

The numerical control program need not necessarily be stored in the memory 86 in advance. The numerical control program may be written in a storage medium readable by a computer system and provided to the user of the additive manufacturing systems 100A, 100B, 100C, and 100D, and may be installed in the memory 86 by the user. The storage medium may be a portable storage medium which is a flexible disk or a flash memory which is a semiconductor memory. The numerical control program may be installed from another computer or a server device to the memory 86 over a communication network.

Next, hardware for implementing the information processing apparatuses 2A, 2B, 2C, and 2D according to the first to fourth embodiments will be described. Each of the information processing apparatuses 2A, 2B, 2C, and 2D can be implemented by hardware similar to the hardware having the configuration illustrated in FIG. 33. Here, an exemplary configuration of a computer system which is the hardware of the information processing apparatuses 2A, 2B, 2C, and 2D will be described with reference to FIG. 33. The functions of the image analysis units 4A, 4B, 4C, and 4D and the molten pool information calculation units 5A, 5B, 5C, and 5D, which are main units of the respective information processing apparatuses 2A, 2B, 2C, and 2D, are each implemented by the processing circuitry 84 including the processor 85 and the memory 86.

The memory 86 stores an information processing program that is a program describing processing for operating as each of the image analysis units 4A, 4B, 4C, and 4D and the molten pool information calculation units 5A, 5B, 5C, and 5D. The processor 85 executes the information processing program to operate as each of the image analysis units 4A, 4B, 4C, and 4D and the molten pool information calculation units 5A, 5B, 5C, and 5D. The input unit 82 is a circuit that receives input signals to each of the information processing apparatuses 2A, 2B, 2C, and 2D from the outside. The output unit 83 is a circuit that outputs signals generated by each of the information processing apparatuses 2A, 2B, 2C, and 2D to the outside.

The information processing program need not necessarily be stored in the memory 86 in advance. The information processing program may be written in a storage medium readable by a computer system and provided to the user of the additive manufacturing systems 100A, 100B, 100C, and 100D, and may be installed in the memory 86 by the user. The storage medium may be a portable storage medium which is a flexible disk or a flash memory which is a semiconductor memory. The information processing program may be installed from another computer or a server device to the memory 86 over a communication network.

Fifth Embodiment

Figure 34:
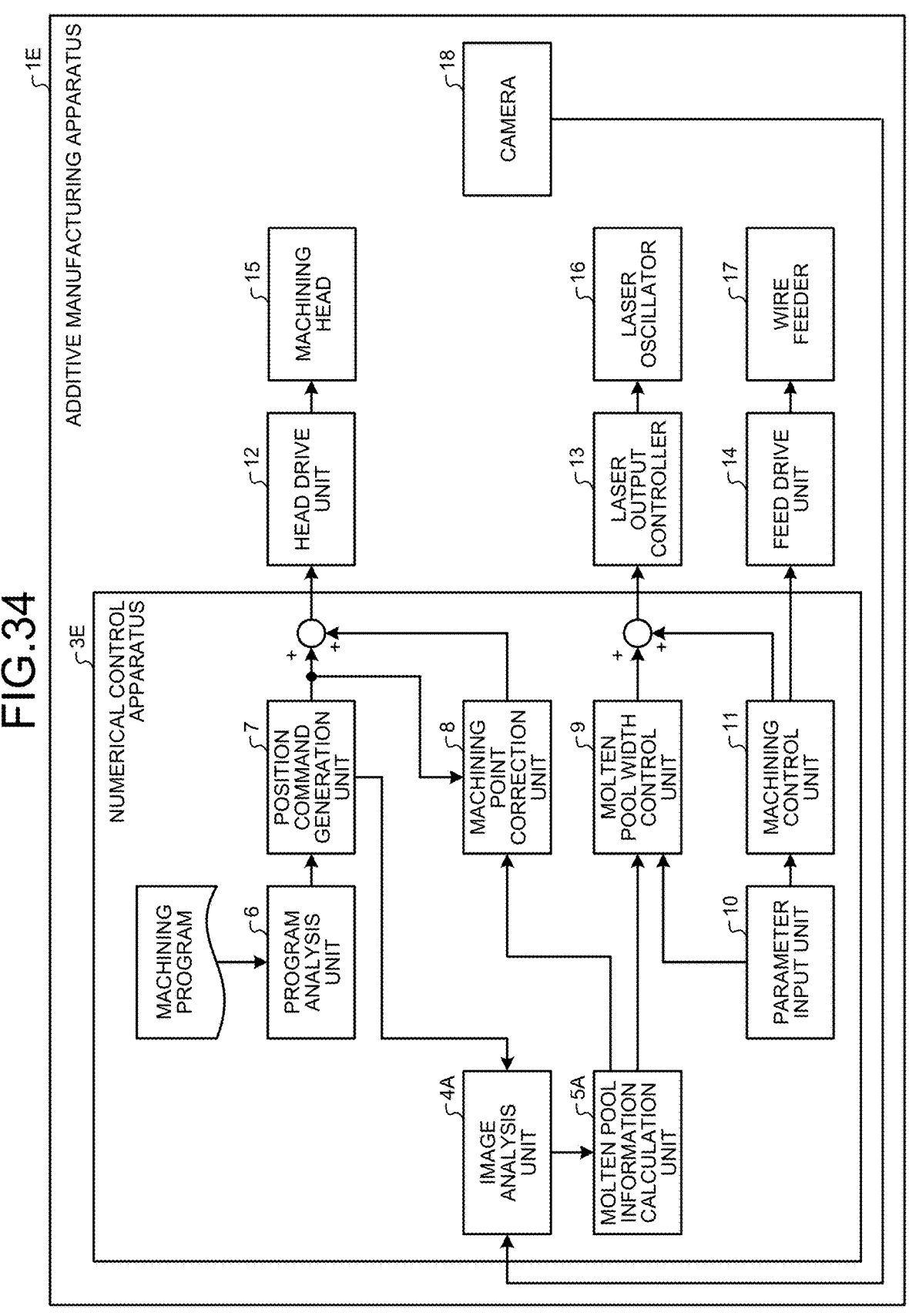
FIG. 34 is a diagram illustrating a configuration of an additive manufacturing apparatus according to a fifth embodiment.

FIG. 34 is a diagram illustrating a configuration of an additive manufacturing apparatus 1E according to the fifth embodiment. The additive manufacturing apparatus 1E includes a numerical control apparatus 3E that controls the additive manufacturing apparatus 1E. The numerical control apparatus 3E is a combination of a configuration similar to that of the numerical control apparatus 3A illustrated in FIG. 1 and the image analysis unit 4A and the molten pool information calculation unit 5A having configurations similar to those of the information processing apparatus 2A illustrated in FIG. 1. In the fifth embodiment, components identical to those in the first to fourth embodiments are denoted by the same reference signs, and configuration differences from the first to fourth embodiments will be mainly described.

In the additive manufacturing apparatus 1E, the image analysis unit 4A and the molten pool information calculation unit 5A inside the numerical control apparatus 3E perform processing similar to that of the image analysis unit 4A and the molten pool information calculation unit 5A in the first embodiment. As a result, the additive manufacturing apparatus 1E can achieve the effect of manufacturing an object with high accuracy in shape.

The numerical control apparatus 3E can be implemented by the hardware configuration illustrated in FIG. 32 or 33. The main units of the numerical control apparatus 3E, namely the image analysis unit 4A, the molten pool information calculation unit 5A, the program analysis unit 6, the position command generation unit 7, the machining point correction unit 8, the molten pool width control unit 9, and the machining control unit 11, can be implemented by the processing circuitry 81 which is dedicated hardware. Alternatively, each main unit of the numerical control apparatus 3E can be implemented by the processing circuitry 84 including the processor 85 and the memory 86. The memory 86 stores a numerical control program that is a program describing processing for operating as each main unit of the numerical control apparatus 3E. The processor 85 executes the numerical control program to operate as each main unit of the numerical control apparatus 3E.

Also in the additive manufacturing apparatuses 1B, 1C, and 1D according to the second to fourth embodiments, the image analysis units 4B, 4C, and 4D and the molten pool information calculation units 5B, 5C, and 5D may be provided in the numerical control apparatuses 3B, 3C, and 3D inside the additive manufacturing apparatuses 1B, 1C, and 1D, respectively.

The configurations described in the above-mentioned embodiments indicate examples of the content of the present disclosure. The configurations of the embodiments can be combined with another well-known technique. The configurations of the embodiments may be combined with each other as appropriate. Some of the configurations of the embodiments can be omitted or changed without departing from the gist of the present disclosure.

REFERENCE SIGNS LIST 1A, 1B, 1C, 1D, 1E additive manufacturing apparatus; 2A, 2B, 2C, 2D information processing apparatus; 3A, 3B, 3C, 3D, 3E numerical control apparatus; 4A, 4B, 4C, 4D image analysis unit; 5A, 5B, 5C, 5D molten pool information calculation unit; 6 program analysis unit; 7 position command generation unit; 8 machining point correction unit; 9 molten pool width control unit; 10 parameter input unit; 11 machining control unit; 12 head drive unit; 13 laser output controller; 14 feed drive unit; 15 machining head; 16 laser oscillator; 17 wire feeder; 18 camera; 19 temperature sensor; 20 laser beam; 21 wire; 22 base material; 23 drive controller; 24 fiber cable; 25 wire spool; 26 region; 27 spot; 28 shadow; 29 temperature distribution; 30, 31 block; 31a, 31b bead; 40, 50, 60 molten pool; 41, 52, 62 rectangle; 42, 53, 53a, 64, 64a center point; 43 shape of bead; 44 target shape; 45, 55a, 55b, 55c, 55d, 55e program command position; 51, 51a, 63 machining progress direction; 54 origin; 56 reflected light; 61 machining path; 81, 84 processing circuitry; 82 input unit; 83 output unit; 85 processor; 86 memory; 100A, 100B, 100C, 100D additive manufacturing system.

The invention claimed is:

1. An additive manufacturing system comprising:

an additive manufacturer configured to manufacture an object by adding a material melted by radiation of a beam to a workpiece; and an information processor configured to communicate with the additive manufacturer, wherein the information processor includes:

first processing circuitry configured to acquire an image of a molten pool formed on the workpiece and information on a progress direction of a machining point on the workpiece;

to extract a contour of the molten pool;

to set a rectangle that circumscribes an extracted contour;

to obtain a plurality of end points of the molten pool based on the image and the progress direction, the end points being respective different contact points between the set rectangle circumscribing the extracted contour and the extracted contour of the molten pool, where opposite long sides of the set rectangle are aligned with the progress direction;

to calculate a width of the molten pool based on position information regarding the plurality of end points; and to calculate a center position of the molten pool based on the position information regarding the plurality of end points and a calculation result of the width of the molten pool, and the additive manufacturer includes:

second processing circuitry configured to adjust a machining parameter of the additive manufacturer using the calculation result of the width of the molten pool such that the molten pool having a width matching a target value of the width of the molten pool is formed; and to correct a position of the machining point using the calculation result of the center position of the molten pool such that the molten pool having a center position matching a plurality of program command positions that are based on a machining program is formed, and by analyzing the machining program, to generate and output to the first processing circuitry the plurality of the program command positions including a current program command position, and a past program command position upstream of the current program command position on a machining path that is a path of the machining point, and to generate and output to the first processing circuitry the information on the progress direction at each of the plurality of the program command positions including a current progress direction of the current program command position and a past progress direction of the past program command position, wherein the first processing circuitry is configured to obtain, using information about each of the plurality of the program command positions, including the program command matching the calculation result of the center position and the information on the progress direction at each of the plurality of the program command positions, the plurality of end points corresponding to each of the plurality of program command positions, the plurality of program command positions including the current program command position and the past program command position indicated by information input to the first processing circuitry, and the information on the progress direction includes the current progress direction at the current program command position and the past progress direction at the past program command position indicated by information input to the first processing circuitry, and the first processing circuitry is configured to calculate the center position of the molten pool and the width of the molten pool using information regarding the plurality of end points corresponding to one or more of the plurality of program command positions.

2. The additive manufacturing system according to claim 1, wherein the first processing circuitry is configured to calculate the center position of the molten pool and the width of the molten pool, using information on the plurality of end points corresponding to the program command position at a position farther than a preset distance from a center of a spot of the beam on the workpiece among the plurality of program command positions.

3. The additive manufacturing system according to claim 1, wherein the first processing circuitry is configured to obtain two or more values of the width of the molten pool using information on the plurality of end points corresponding to two or more of the plurality of program command positions, and to calculate an average of the two or more values.

4. The additive manufacturing system according to claim 1, wherein the first processing circuitry is configured to calculate the center position of the molten pool and the width of the molten pool, using information on the plurality of end points corresponding to the program command position at a position farther than a preset distance from a center of a spot of the beam on the workpiece among the plurality of program command positions.

5. The additive manufacturing system according to claim 1, wherein the first processing circuitry is configured to obtain two or more values of the width of the molten pool using information on the plurality of end points corresponding to two or more of the plurality of program command positions, and to calculate an average of the two or more values.

6. The additive manufacturing system according to claim 1, wherein each side of the set rectangle has a corresponding one of the plurality of end points, and the end points at the opposite long sides of the set rectangle are offset from each other in a length direction of the molten pool and/or the end points at opposite short sides of the set rectangle are offset from each other in a width direction of the molten pool.

7. The additive manufacturing system according to claim 1, wherein the extracted contour is asymmetrical in a length direction and a width direction of the molten pool.

8. The additive manufacturing system according to claim 1, wherein the calculated center position of the molten pool is closer to a leading short side of the set rectangle than the calculated center position is to a trailing short side of the set rectangle.

9. The additive manufacturing system according to claim 1, wherein the first processing circuitry is configured to extract a contour of the molten pool as the extracted contour of the molten pool based on the acquired image of the molten pool.

* * * * *